United States Patent [19]
Fujii

[11] Patent Number: 6,160,377
[45] Date of Patent: *Dec. 12, 2000

[54] BATTERY CHARGING DEVICE AND METHOD AND ELECTRONIC DEVICE

[75] Inventor: Kenichi Fujii, Inagi, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/174,414

[22] Filed: Oct. 19, 1998

[30] Foreign Application Priority Data

| Oct. 20, 1997 | [JP] | Japan | 9-287340 |
| Jun. 2, 1998 | [JP] | Japan | 10-153267 |

[51] Int. Cl.[7] ................ H02J 7/00; H02J 7/14
[52] U.S. Cl. ............. 320/117; 320/149; 320/160
[58] Field of Search ................ 320/117, 160, 320/119, 149, 116

[56] References Cited

U.S. PATENT DOCUMENTS

| 2,506,340 | 5/1950 | Buckley. | |
| 4,246,529 | 1/1981 | Jurgens et al.. | |
| 5,729,117 | 3/1998 | Fukuda | 320/117 |
| 5,808,444 | 9/1998 | Saeki et al. | 320/117 |

FOREIGN PATENT DOCUMENTS

| 0 069 640 | 1/1983 | European Pat. Off.. |
| 0512 340 A1 | 11/1992 | European Pat. Off.. |
| 0 621 649 A1 | 10/1994 | European Pat. Off.. |
| 0 662 751 A1 | 7/1995 | European Pat. Off.. |
| 0 665 628 A2 | 8/1995 | European Pat. Off.. |
| 8-79982 | 3/1986 | Japan. |
| 61-124237 | 6/1986 | Japan. |
| 1-238437 | 9/1989 | Japan. |
| 2-303328 | 12/1990 | Japan. |
| 4-275031 | 9/1992 | Japan. |
| 6-303729 | 10/1994 | Japan. |
| 9-103033 | 4/1997 | Japan. |
| 1 304 694 | 5/1965 | United Kingdom. |
| 1 285 191 | 8/1972 | United Kingdom. |
| 1 437 888 | 6/1973 | United Kingdom. |
| 2 010 607 | 6/1979 | United Kingdom. |
| 1 551 655 | 8/1979 | United Kingdom. |
| 2 156 611 | 10/1985 | United Kingdom. |
| 2 504 203 | 9/1992 | United Kingdom. |
| 2 255 243 | 10/1992 | United Kingdom. |
| 2 265 056 | 9/1993 | United Kingdom. |
| 2 279 802 | 1/1995 | United Kingdom. |
| 2 292 845 | 3/1996 | United Kingdom. |
| 2 308 024 | 6/1997 | United Kingdom. |
| 2 308 025 | 6/1997 | United Kingdom. |
| 2 308 026 | 6/1997 | United Kingdom. |
| WO 93/05560 | 3/1993 | WIPO. |
| WO 95/00992 | 1/1995 | WIPO. |

OTHER PUBLICATIONS

Translation of revelant portions of Japanese laid–open application no. 58–144542.
Translation of Japanese laid–open application no. 61–154432.
Partial translation of japanese laid–open application no. 2–19912.
Japanese patent application laid–open 4–251,528
Japanese patent application laid–open 6–303729
Smart Battery Systems Specifications–Smart Battery Data Specification, Revision 1.0 (Feb. 15, 1995).

*Primary Examiner*—Edward H. Tso
*Assistant Examiner*—Gregory J. Toatley, Jr.
*Attorney, Agent, or Firm*—Armstrong, Westerman, Hattori, McLeland & Naughton

[57] ABSTRACT

A battery charging device which charges a plurality of batteries includes a charging part which supplies a charging current, and a control part which controls the charging part so that the batteries are serially charged one by one and a supplemental charge to the batteries is then performed in parallel. The control part calculates a charged capacity for a first one of the batteries and thus determines a timing in which serial charge is switched to a second one of the batteries on the basis of the charged capacity.

46 Claims, 11 Drawing Sheets

FIG. 11

| FUNCTION | UNIT | |
|---|---|---|
| CURRNET | mA | + : CHARGING CURRENT,<br>− : DISCHARGING CURRENT |
| VOLTAGE | V | WHEN CHARGING : CHARGING VOLRAGE,<br>WHEN DISCHARGING : DISCHARGING VOLTAGE |
| TEMPERATURE | °K | |
| CHARGED CAPACITY | % | =REMAINING CAPACITY |

BATTERY CHARGING DEVICE AND METHOD AND ELECTRONIC DEVICE

BACKGROUND OF THE INVENTION

1. Field of the Invention

The present invention generally relates to battery charging devices and methods, and more particularly to a device and method for charging a plurality of batteries.

Recently, many electronic devices, particularly, portable electronic devices have been designed to be equipped with a plurality of battery packs. Further, a lithium-based secondary battery or cell having a high energy density has widely become used in order to increase the battery usable or operable time. An example of such a lithium-based secondary battery is a lithium-ion cell. In the near future, another lithium-based battery having a higher energy density, such as a lithium-polymer battery, will be used as a secondary battery in practice.

The present invention relates to a device and method for charging such a secondary battery having a high energy density.

2. Description of the Related Art.

Conventionally, a battery charging device is available which can charge a plurality of lithium-based secondary batteries. In a conventional serial manner, the secondary batteries are subjected to charging one by one until the selected battery is completely charged up. In a conventional parallel manner, the batteries are connected in parallel and are simultaneously subjected to charging. If it is required to reduce the charging time, the parallel charge will be selected. If it is required to replace a battery with another battery, the serial charge will be selected. The serial charge can simply be implemented, whereas it takes a comparatively long charging time. The parallel charge requires a comparatively short charging time, whereas it is not suitable for a usage such that a battery is replaced by another one.

Another battery charging device has been proposed in which either the serial charge or parallel charge is selectively carried out on the basis of the capacities of the batteries to be subjected to charge (see Japanese Laid-Open Patent Application No. 4-251528). If the batteries have sufficiently been charged with electricity, the batteries are connected in series. If the batteries have not sufficiently been charged, namely, the batteries do not have sufficient capacities, the batteries are connected in parallel ad are subjected to quick charge.

Yet another battery charging device has been proposed in which a plurality of batteries are charged one by one and are then subjected to simultaneous charge (see Japanese Laid-Open Patent Application No. 6-303729). In the proposed charging device, a charging current which flows in one of the batteries is detected. If the charging current detected becomes equal to or lower than a given threshold level, the charging current is switched to another battery. When charging currents respectively flowing through the batteries become equal to or lower than the given threshold level, all the batteries are simultaneously supplied with the charging currents. The time during which the charging currents are being supplied to the respective batteries is controlled by referring to a timer. The switching between the batteries is based on only the information concerning the charging currents.

However, the conventional battery charging device as disclosed in Japanese Laid-Open Patent Application No. 4-251528 is not designed by taking into consideration the secondary batteries having a high energy density such as lithium-based secondary batteries. Thus, it takes a long time to charge the lithium-based batteries so that the batteries cannot efficiently be charged.

The conventional battery charging device as disclosed in Japanese Laid-Open Patent Application No. 6-303729 switches the battery which is being charged to another battery by referring to only the magnitude of the charging current. Hence, an error in measurement of the charging current will not correctly define the battery switching timing.

SUMMARY OF THE INVENTION

It is a general object of the present invention to provide a battery charging device and method in which the above disadvantages are eliminated.

A more specific object of the present invention is to provide a battery charging device and method which has high applicability and can efficiently charge a plurality of batteries with a reduced charging time.

The above objects of the present invention are achieved by a battery charging device which charges a plurality of batteries, comprising: a charging part which supplies a charging current; and a control part which controls the charging part so that the batteries are serially charged one by one and a supplemental charge to the batteries is then performed in parallel, the control part calculating a charged capacity for a first one of the batteries and thus determining a timing in which serial charge is switched to a second one of the batteries on the basis of the charged capacity. The serial charge is stopped and the supplemental charge to the batteries is performed in parallel. Hence, it is possible to reduce the time it takes to completely charge the batteries. The term "battery includes a single packed battery, and a lithium-based battery pack capable of accommodating a plurality of batteries.

The above battery charging device may be configured so that the charged capacity is an integrated value of a charging current supplied to the first one of the batteries. Also, the battery charging device may be configured so that the charging capacity is a ratio of an integrated value of a charging current supplied to the first one of the batteries to a total integrated value of the charging current obtained in a fully charged state. Hence, the battery charging device can precisely detect the charged capacity as compared to prior art in which the charging current is merely monitored.

The above objects of the present invention are also achieved by a battery charging device having a function of communicating with a plurality of batteries, comprising: a charging part which supplies a charging current; and a control part which controls the charging part so that the batteries are serially charged one by one and a supplemental charge to the batteries is then performed in parallel. The control part calculates a charged capacity for a first one of the batteries on the basis of predetermined information supplied therefrom, and thus determines a timing in which serial charge is switched to a second one of the batteries on the basis of the charged capacity. Hence, it is possible to reduce the time necessary to charge the batteries.

The battery charging device may be configured so that, if the predetermined information includes information concerning the charged capacity calculated beforehand, the control part determining the timing in which serial charge is switched on the basis of the charged capacity included in the predetermined information.

The battery charging device may be configured so that, if the predetermined information includes information concerning a charging current supplied to the first one of the batteries which is being charged or information concerning the charged capacity calculated beforehand, the charged capacity is an integrated value of the charging current.

The battery charging device may be configured so that, if the predetermined information includes information concerning a charging current supplied to the first one of the batteries which is being charged or information concerning the charged capacity calculated beforehand, the charged capacity is a ratio of an integrated value of the charging current supplied to the first one of the batteries to a total integrated value of the charging current obtained in a fully charged state.

The battery charging device may be configured so that, if the predetermined information includes information concerning a charging current and a charging voltage supplied to the first one of the batteries which is being charged or information concerning the charged capacity calculated beforehand, the charged capacity is an integrated value of power obtained by a product of the charging current and the charging voltage.

The battery charging device may be configured so that, if the predetermined information includes information concerning a charging current and a charging voltage supplied to the first one of the batteries which is being charged or information concerning the charged capacity calculated beforehand, the charged capacity is a ratio of an integrated value of power already supplied to the first one of the batteries to a total integrated value of power in a fully charged state.

With the above configurations of the battery charging devices, it is possible to more precisely detect the charged capacity (mAh, %) than the prior art in which the charging current is merely monitored.

The battery charging may be configured so that, if the predetermined information includes temperature information, the control parts corrects the charged capacity on the basis of the temperature information.

The battery charging device may be configured so that: the charging part includes switches respectively connected to the batteries in series; and the control part controls the switches.

The battery charging device may be configured so that the batteries are lithium-based batteries.

The above objects of the present invention are also achieved by a method for charging a plurality of batteries by a battery charging device which includes a charging part supplying a charging current, the method comprising the steps of: (a) serially charging the batteries one by one and then performing a supplemental charge to the batteries in parallel; and (b) calculating a charged capacity for a first one of the batteries and thus determining a timing in which serial charge is switched to a second one of the batteries on the basis of the charged capacity.

The method may be configured so that the charged capacity is an integrated value of a charging current supplied to the first one of the batteries.

The method may be configured so that the charging capacity is a ratio of an integrated value of a charging current supplied to the first one of the batteries to a total integrated value of the charging current obtained in a fully charged state.

The above objects of the present invention are also achieved by a method of charging a plurality of batteries by a device having a function of communicating with the batteries and a charging part supplying a charging current, the method comprising the steps of: (a) serially charging the batteries one by one and performing a supplemental charge to the batteries in parallel; and (b) calculating a charged capacity for a first one of the batteries on the basis of predetermined information supplied therefrom and thus determining a timing in which serial charge is switched to a second one of the batteries on the basis of the charged capacity.

The method may further comprise the step of, if the predetermined information includes information concerning the charged capacity calculated beforehand, determining the timing in which serial charge is switched on the basis of the charged capacity included in the predetermined information.

The method may further comprise the step of, if the predetermined information includes information concerning a charging current supplied to the first one of the batteries which is being charged or information concerning the charged capacity calculated beforehand, the charged capacity is an integrated value of the charging current.

The method may be configured so that, if the predetermined information includes information concerning a charging current supplied to the first one of the batteries which is being charged or information concerning the charged capacity calculated beforehand, the charged capacity is a ratio of an integrated value of the charging current supplied to the first one of the batteries to a total integrated value of the charging current obtained in a fully charged state.

The method may be configured so that, if the predetermined information includes information concerning a charging current and a charging voltage supplied to the first one of the batteries which is being charged or information concerning the charged capacity calculated beforehand, the charged capacity is an integrated value of power obtained by a product of the charging current and the charging voltage.

The method may be configured so that, if the predetermined information includes information concerning a charging current and a charging voltage supplied to the first one of the batteries which is being charged or information concerning the charged capacity calculated beforehand, the charged capacity is a ratio of an integrated value of power already supplied to the first one of the batteries to a total integrated value of power in a fully charged state.

The method may be configured so that it further comprises the step of, if the predetermined information includes temperature information, correcting the charged capacity on the basis of the temperature information.

It is another object of the present invention to provide an electronic device comprising: a battery charging device which charges a plurality of batteries, the battery charging device comprising: a charging part which supplies a charging current; and a control part which controls the charging part so that the batteries are serially charged one by one and a supplemental charge to the batteries is then performed in parallel. The control part calculates a charged capacity for a first one of the batteries and thus determines a timing in which serial charge is switched to a second one of the batteries on the basis of the charged capacity.

The electronic device may be configured so that the charged capacity is an integrated value of a charging current supplied to the first one of the batteries.

The electronic device may be configured so that the charging capacity is a ratio of an integrated value of a charging current supplied to the first one of the batteries to a total integrated value of the charging current obtained in a fully charged state.

Yet another object of the present invention is to provide an electronic device comprising: a battery charging device having a function of communicating with a plurality of batteries, the battery charging device comprising: a charging part which supplies a charging current; and a control part which controls the charging part so that the batteries are serially charged one by one and a supplemental charge to the batteries is then performed in parallel. The control part calculates a charged capacity for a first one of the batteries on the basis of predetermined information supplied therefrom and thus determines a timing in which serial charge is switched to a second one of the batteries on the basis of the charged capacity.

The electronic device may be configured so that, if the predetermined information includes information concerning the charged capacity calculated beforehand, the control part determining the timing in which serial charge is switched on the basis of the charged capacity included in the predetermined information.

The electronic device may be configured so that, if the predetermined information includes information concerning a charging current supplied to the first one of the batteries which is being charged or information concerning the charged capacity calculated beforehand, the charged capacity is an integrated value of the charging current.

The electronic device may be configured so that, if the predetermined information includes information concerning a charging current supplied to the first one of the batteries which is being charged or information concerning the charged capacity calculated beforehand, the charged capacity is a ratio of an integrated value of the charging current supplied to the first one of the batteries to a total integrated value of the charging current obtained in a fully charged state.

The electronic device may be configured so that, if the predetermined information includes information concerning a charging current and a charging voltage supplied to the first one of the batteries which is being charged or information concerning the charged capacity calculated beforehand, the charged capacity is an integrated value of power obtained by a product of the charging current and the charging voltage.

The electronic device may be configured so that, if the predetermined information includes information concerning a charging current and a charging voltage supplied to the first one of the batteries which is being charged or information concerning the charged capacity calculated beforehand, the charged capacity is a ratio of an integrated value of power already supplied to the first one of the batteries to a total integrated value of power in a fully charged state.

The electronic device may be configured so that, if the predetermined information includes temperature information, the control parts corrects the charged capacity on the basis of the temperature information.

A further object of the present invention is to provide a control circuit provided in a battery charging device which charges a plurality of batteries, the control circuit comprising: a charging part which supplies a charging current; and a control part which controls the charging part so that the batteries are serially charged one by one and a supplemental charge to the batteries is then performed in parallel. The control part calculates a charged capacity for a first one of the batteries and thus determines a timing in which serial charge is switched to a second one of the batteries on the basis of the charged capacity.

Another object of the present invention is to provide a control circuit provided in a battery charging device which charges a plurality of batteries, the control circuit comprising: a charging part which supplies a charging current; and a control part which controls the charging part so that the batteries are serially charged one by one and a supplemental charge to the batteries is then performed in parallel, the control part calculating a charged capacity for a first one of the batteries on the basis of predetermined information supplied therefrom and thus determining a timing in which serial charge is switched to a second one of the batteries on the basis of the charged capacity.

The control circuit may be configured so that, if the predetermined information includes information concerning the charged capacity calculated beforehand, the control part determining the timing in which serial charge is switched on the basis of the charged capacity included in the predetermined information.

BRIEF DESCRIPTION OF THE DRAWINGS

Other objects, features and advantages of the present invention will become more apparent from the following detailed description when read in conjunction with the accompanying drawings, in which:

FIG. 11 shows predetermined information which can be obtained from the battery pack.

DETAILED DESCRIPTION OF THE PREFERRED EMBODIMENTS

Figure 1:
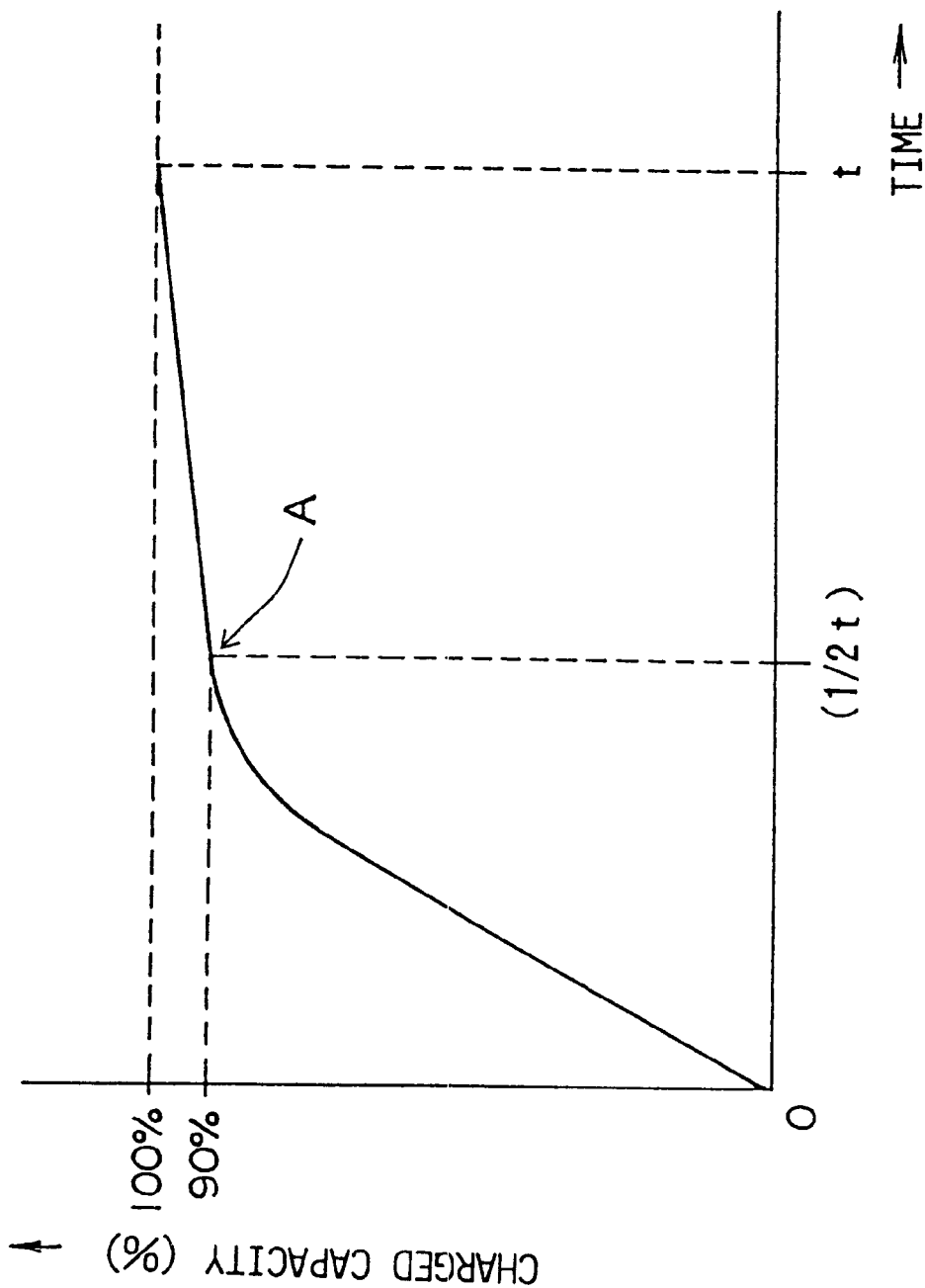
FIG. 1 is a graph of a relationship between charged capacity and charging time of a lithium-based battery.

FIG. 1 is a graph of a charged capacity as a function of time obtained when a general lithium-based battery pack is charged. As shown, a battery pack is charged up to 90% of the fully charged level with the time approximately half the time necessary for complete charge. Thus, it takes the time approximately half the total charging time to charge the remaining 10%. According to the present invention, the time necessary to charge the battery pack up to 90% is defined as a reference time. A plurality of battery packs are selected one by one and are then subjected to charge until the reference time. When all the battery packs have been charged up to 90% of the fully charged level, these battery packs are charged in parallel. Since all the battery packs have been charged up to 90%, the remaining 10% charge is a top-off charge (supplemental charge).

Figure 2:
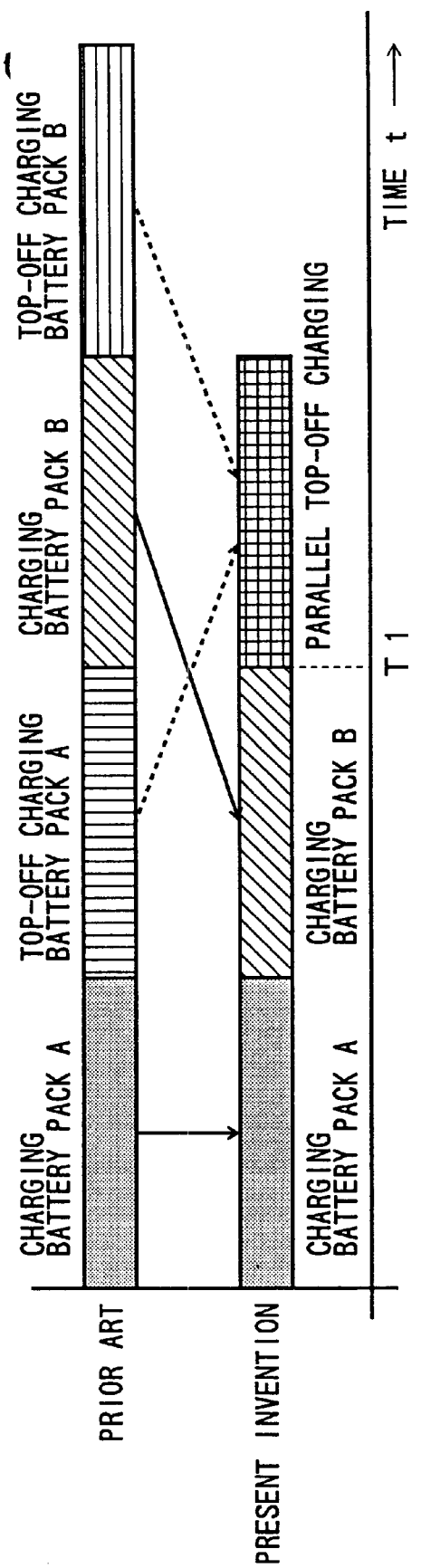
FIG. 2 is a graph of a conventional battery charging method and a battery charging method of the present invention.

FIG. 2 is a graph showing a conventional charge sequence and the present invention sequence. The sequences of FIG. 2 are directed to charging two battery packs A and B. In the conventional serial charge, the battery pack A is continuously carried out up to the top-off charge, and is thus charged up to approximately 100%. Then, the battery pack B is continuously carried out up to the top-off charge. In contrast, according to the present invention, the battery pack A is charged up to a given capacity level (equal to, for example, 90% of the fully charged level). Then, the battery pack B is charged up to the given capacity. Thereafter, the battery packs A and B are subjected to the parallel top-off charge, so that the remaining 10% charge can be completed. Although the present invention employs the serial charge, the total charging time for the battery packs A and B can be reduced to ¾ of the total charging time obtained in the conventional manner. While the battery pack A or B is being charged in serial formation, the other battery pack can be pulled out or inserted. Hence, the convenience based on the serial charge is retained, nevertheless the total charging time can be reduced.

The above-mentioned charging method of the present invention is not limit to the lithium-based battery pack, but can be applied to secondary battery packs having a characteristic as shown in FIG. 1. Also, the present invention is not limited to the reference time when the 90% charge to the battery pack is completed, but the reference time can be selected by taking into consideration various conditions such as the capacity of the battery pack, the relationship between the time and the charged capacity and the magnitude of a load driven by the battery or batteries. Even if the charge is switched to the parallel top-off charge at a level which does not reach the 90% charge, no problem will occur if the battery pack can drive the load in the expected manner without a drastic decrease in the capacity and another battery pack can be charged up to the above-mentioned level lower than 90% while the above-mentioned battery pack is driving the load.

Figure 3:
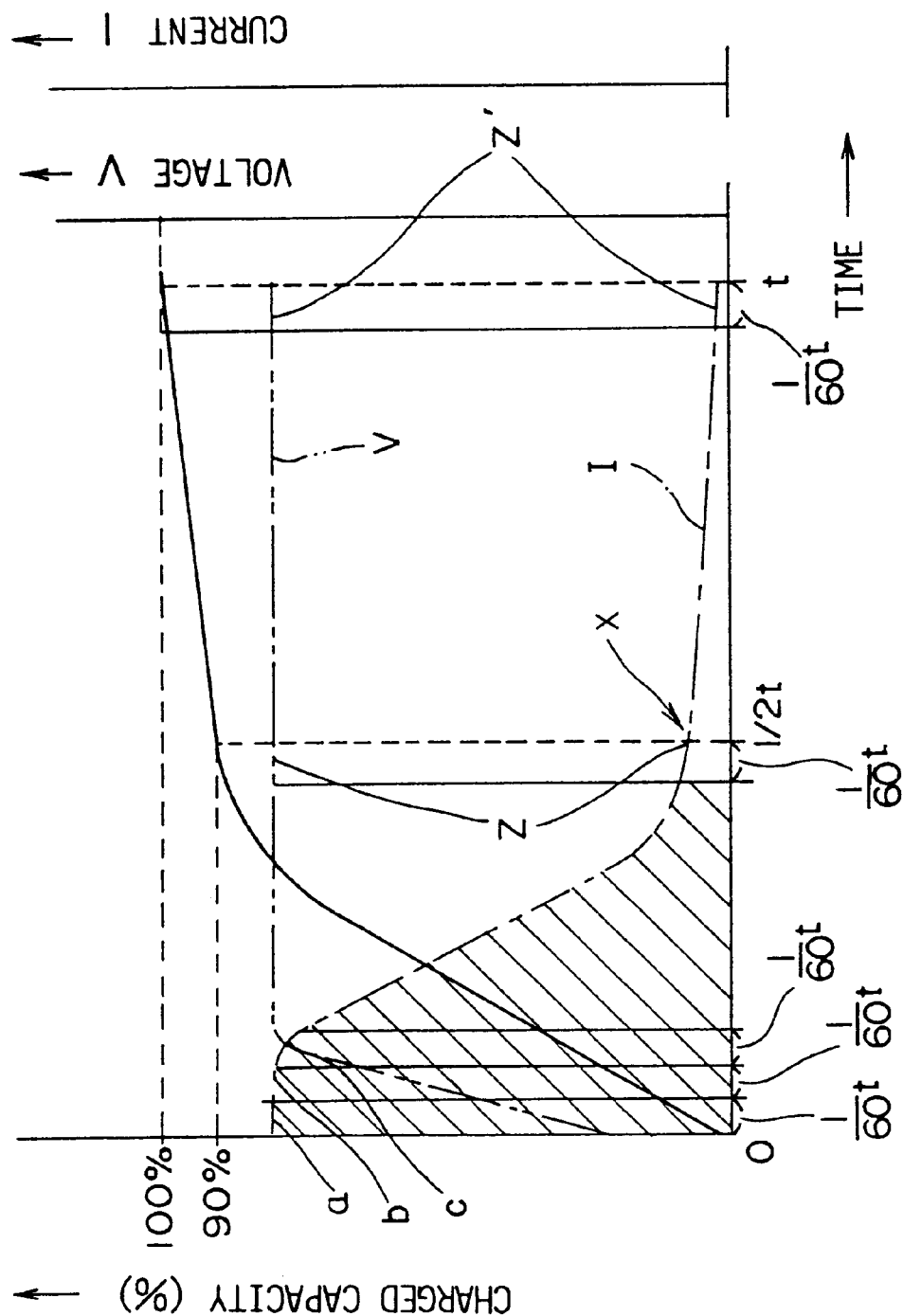
FIG. 3 is a graph of a relationship between battery charging time, charged capacity, charging voltage and charging current of the lithium-based battery.

FIG. 3 is a graph obtained by superimposing variations in a charging current I and a charging voltage V onto the graph of FIG. 1. The charging current I is a current supplied to the battery pack, and the charging voltage V is a voltage developing across the plus and minus terminals of the battery pack. The graph of FIG. 3 shows that the charging current I reduces as the charge progresses. The charging current I is integrated every given time, and the integrated value is checked. Hence, it is possible to detect the charged capacity (mAh, %), as compared to the conventional charging device (disclosed in, for example, Japanese Laid-Open Patent Application No. 6-303729) in which the charging current I is merely monitored.

It will now be assumed that the serial charge is used to charge 90% of the fully charged level of the battery pack. The charging current I flowing in the battery pack is integrated every given time. When the integrated value reaches 90% of the fully charged level, the charge to the battery pack is stopped, and the next battery pack is subjected to the serial charge or all the battery packs are subjected to the parallel charge.

Figure 4:
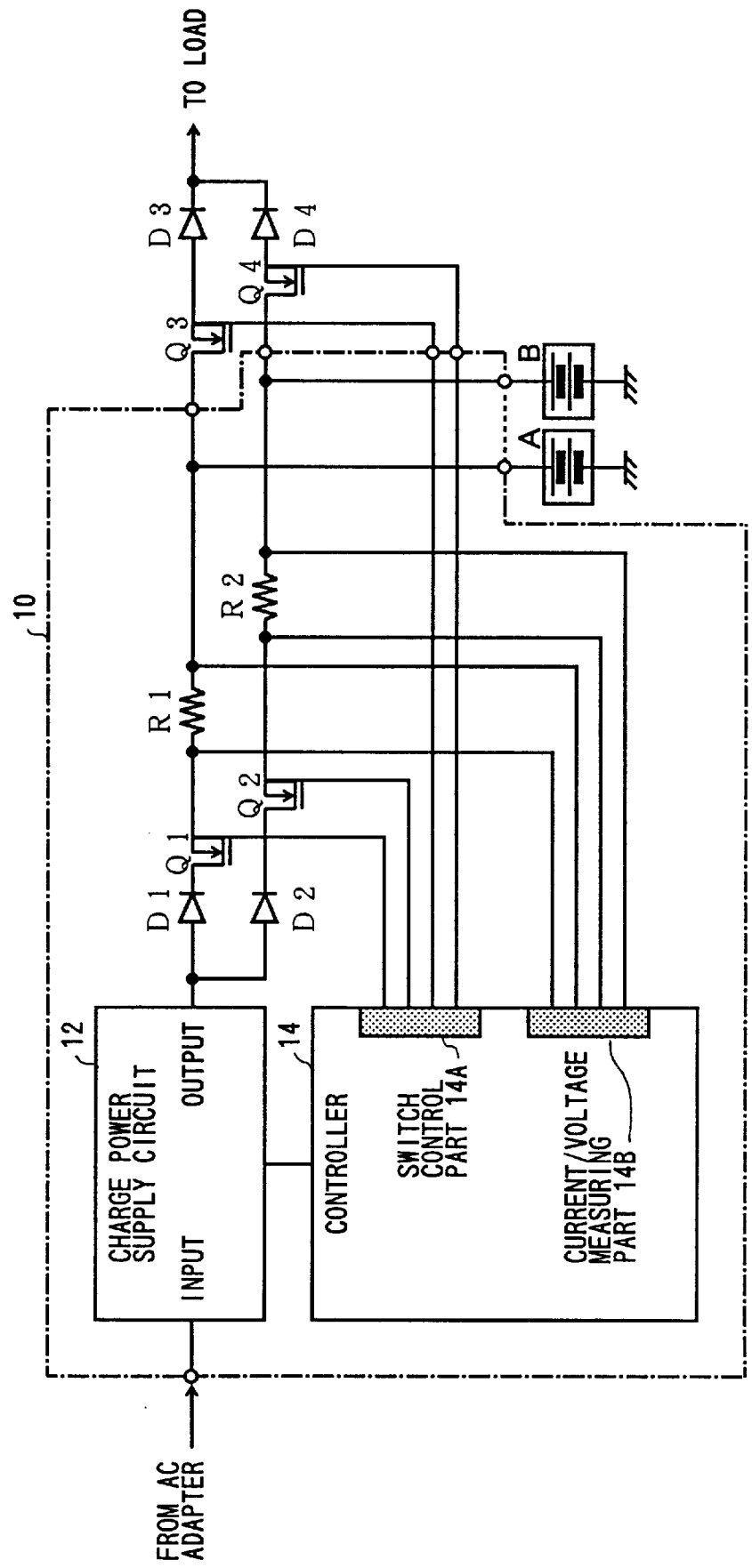
FIG. 4 is a block diagram of a battery charging device according to an embodiment of the present invention.

FIG. 4 is a circuit of a battery driving device according to an embodiment of the present invention. A battery driving device 10 shown in FIG. 4 includes a charge power supply circuit 12, a controller 14, diodes D1 and D2, transistors Q1 and Q2 and resistors R1 and R2. The charge power supply circuit 12, the diodes D1 and D2, the transistors Q1 and Q2 and the resistors R1 and R2 form a charging part, and the controller 14 forms a control part.

The charge power supply circuit 12 of the battery charge device 10 receives a dc input voltage from an AC adapter which is not shown, and generates a charge output for charging therefrom. The charge output is supplied to first and second charge paths. The first charge path includes the diode D1, the transistor Q1 and the resistor R1. The second charge path includes the diode D2, the transistor Q2 and the resistor R2. A lithium-based battery pack A can be connected to the first charge path, and a lithium-based battery pack B can be connected to the second charge path. The diodes D1 and D2 prevent currents from flowing through the first and second charge paths in the reverse directions. The transistors Q1 and Q2 turn ON and OFF the first and second charge paths. The resistor R1 is used to measure the charging current flowing through the first charge path to which the battery pack A is connected. The resistor R2 is used to measure the charging current flowing through the second charge path to which the battery pack B is connected.

The controller 14 includes a switch control part 14A and a current/voltage measuring part 14B. The switch control part 14A turns ON and OFF the transistors Q1 and Q2, which are N-channel field effect transistors, and turns ON and OFF the transistors Q3 and Q4, which are N-channel field effect transistors. The current/voltage measuring part 14B measures the voltage drops respectively developing across the resistors R1 and R2 having known resistance values, and measures currents (that is, the charging current I shown in FIG. 3) flowing in the first and second charge paths.

The transistors Q3 and Q4 and the diodes D3 and D4 form an interface part of the power supply system of an electronic device to which the battery charging device 10 is connected. The transistor Q3 connects the battery pack A to an internal load of the electronic device via the diode D3. The transistor Q4 connects the battery pack B to the internal load of the electronic device via the diode D4.

In the configuration shown in FIG. 4, the transistors Q3 and Q4 and the diodes D3 and D4 may be provided in the battery charging device 10. In this case, the battery charging device 10 can charge the two battery packs A and B, and a single power supply terminal is used via which the power supply voltage for driving the load is output. The battery charging circuit 10 may be configured so that it includes the AC adapter (not shown in FIG. 4).

The controller 14 realizes the charge sequence of the present invention shown in FIG. 2. The controller 14 can be formed of a general-use microprocessor (for example, MB89875 produced by Fujitsu Limited), and is programmed so as to implement the sequence shown in FIG. 2.

A description will now be given, with reference to FIGS. 5, 6 and 7, of the operation of the controller 14.

Figure 5:
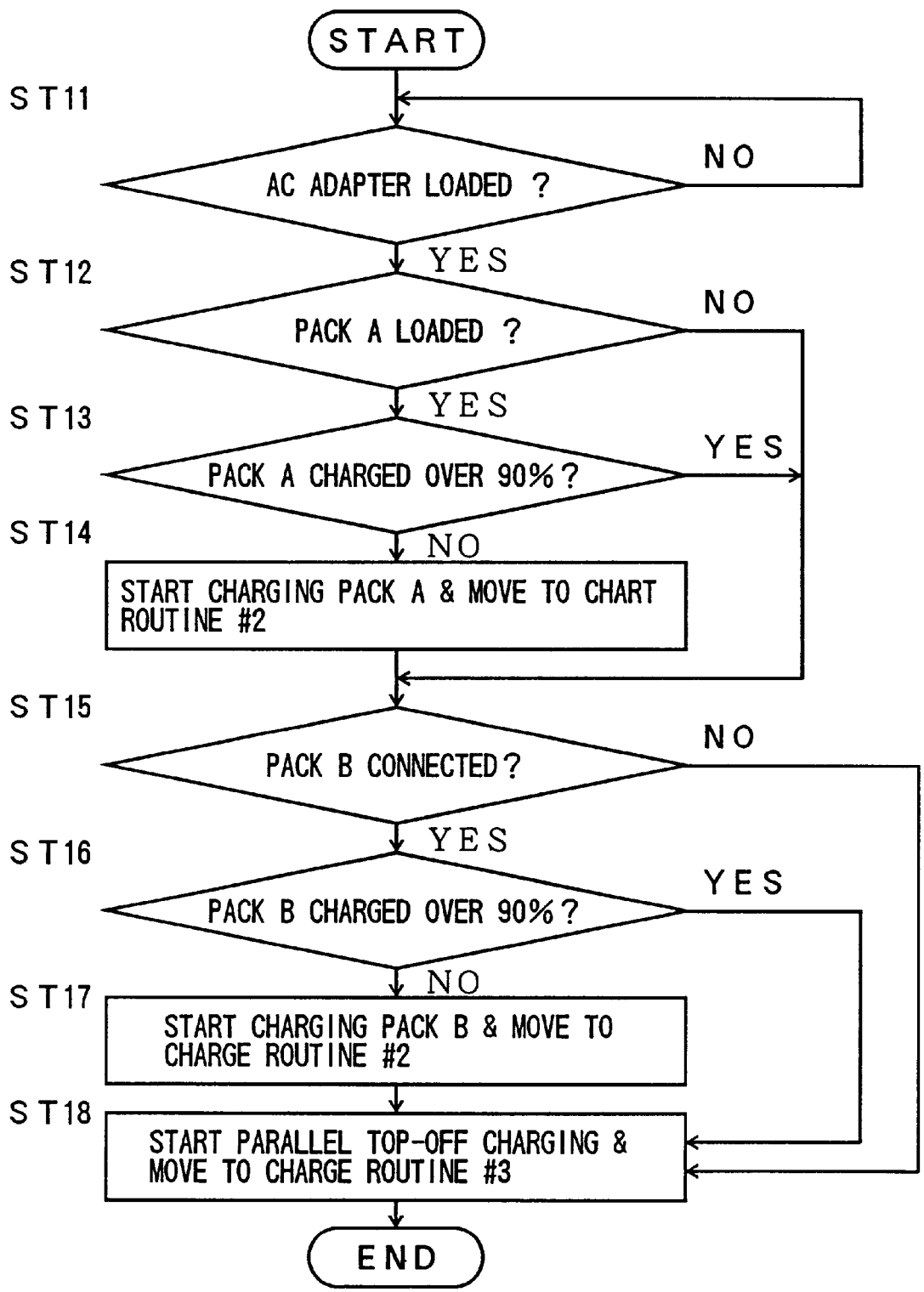
FIG. 5 is a flowchart of a first part of an operation of a controller shown in FIG. 4.

At step ST11 shown in FIG. 5, the controller 14 determines whether the AC adapter is loaded by checking whether the dc output voltage or current is supplied to the charge power supply circuit 12 from the AC adapter. If the AC adapter is not loaded (NO at step ST11), the controller 14 executes step ST11 again. If the AC adapter is loaded, the controller 14 determines, at step ST12, whether the battery pack A is connected.

At step ST12, the controller 14 causes the charge power supply circuit 12 to output an arbitrary charging voltage in a state in which the transistors Q1 and Q3 are turned ON and OFF, respectively, and determines whether a voltage drop develops across the resistor R1. If the battery pack A is not connected, the charging current does not flow, and no voltage drop develops across the resistor R1. In this case, the result of step ST12 is NO, and the controller 14 proceeds with step ST15, at which it is determined whether the battery pack B is connected. If it is determined at step ST12 that the battery pack A is connected, the controller 14 proceeds with step ST13.

At step ST13, the controller 14 determines whether the charging current for the battery pack A exceeds a predetermined current level by referring to the value of the charging current detected at step ST12. For example, if the charging current detected is less than the charging current I obtained at point X shown in FIG. 3, the controller 14 sets the determination result of step ST13 to YES, and proceeds with step ST15. Then, the controller 14 determines whether the battery pack B is connected.

If the charging current detected exceeds the charging current I obtained at the point X shown in FIG. 3, the controller 14 sets the determination result of step ST13 to NO, and recognizes at step ST14 that the battery pack A should be subjected to the serial charge. Then, the controller 14 executes charge routine #2 shown in FIG. 6. The charge routine #2 will be described below.

Figure 6:
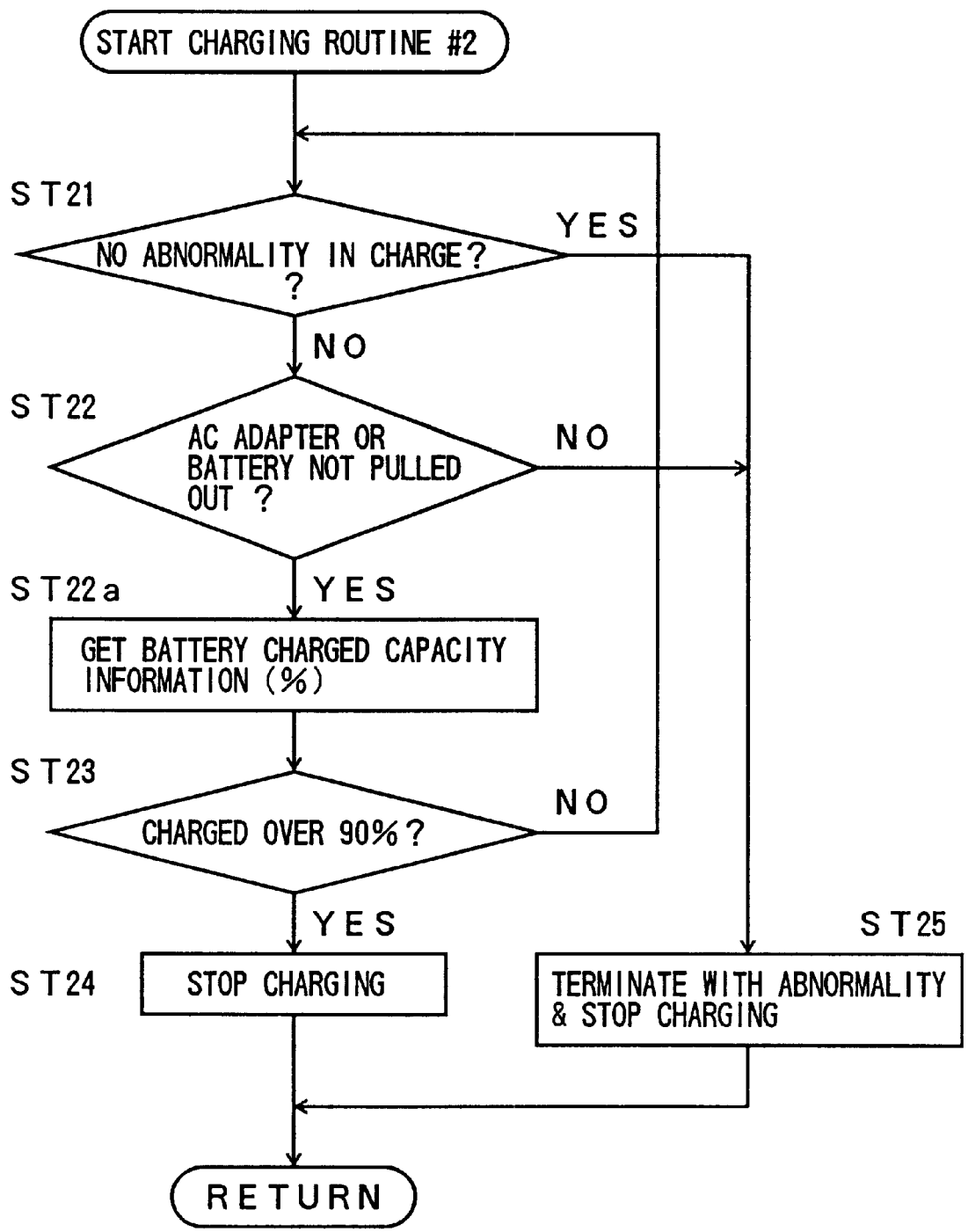
FIG. 6 is a flowchart of a second part of the operation of the controller shown in FIG. 4.

At step ST21 shown in FIG. 6, the controller 14 determines whether there is an abnormality in charging (for example, whether an excessive charging current flows). If it is determined that an abnormal charge takes place, the controller 14 sets the determination result of the step ST21 to NO, and controls, at step ST25, the charge power supply circuit 12 so that the serial charge is stopped. Hence, the charge power supply circuit 12 is caused to output the charging voltage.

If it is determined, at step ST21, that there is no abnormality in charging, the controller 14 sets the determination result of step ST21 to YES, and determines, at step ST22, whether the AC adapter or the battery pack A has been pulled out. If it is determined that the AC adapter or the battery pack A has been pulled out, the controller 14 sets the determination result of step ST22 to NO, and controls, at step ST25, the charge power supply circuit 12 so that the serial charge is stopped.

If it is determined that the AC adapter or the battery pack A has been loaded, the controller 14 sets the determination result of step ST22 to YES, and calculates the charged capacity in order to determine the timing at which the battery pack B is instead subjected to the serial charge.

A description will now be given of a first method for calculating a first charged capacity. The controller 14 calculates the integrated value of the charging current as the charged capacity for the battery pack A, and determines whether the integrated value exceeds a given value. In this case, time (½)t shown in FIG. 3 is defined as a timing at which the serial charge is switched to the battery pack B from the battery pack A. The section from 0t to (½)t is divided into 60 parts so that each of the divided units is equal to a time of (1/60)t. The charging currents respectively obtained for the units are integrated. The integrated value corresponds to the hatched area shown in FIG. 3.

That is, the charged capacity which functions as the reference for switching the charging operation to another battery pack can be expressed as follows:

$$[\text{charged capacity (mAh) as reference}] = \\ [\text{charging current (mA) of "a" shown in FIG. 3} \times (1/60)t\ (h)] + [\text{charging current af "b"} \\ \times (1/60)t] + [\text{charging current of "c"} \times \\ (1/60)t] + \ldots + [\text{charging current of "z"} \\ \times (1/60)t] \quad (1)$$

where 1(/60)t(h) denotes the unit time.

At step 22a, the controller 14 measures the voltage drop developing across the resistor R1 every unit time, and defines the charging current derived from the measured voltage drop as the charged capacity (mA). The charged capacity thus obtained is stored in the controller 14.

Then, the controller 14 determines, at step ST23, whether the integrated charged capacity reaches the reference charged capacity (mAh) for the battery pack A. If the result of the above determination is negative, the controller 14 sets the determination result of step ST23 to NO, and repeatedly executes the steps ST21, ST22, ST22a and ST23 until the integrated charged capacity (mAh) reaches the reference charged capacity (mAh) for the battery pack A.

That is, the charged capacity (integration of the charged currents respectively obtained every unit time) is calculated as follows:

$$[\text{charged capacity (mAh)}] = \\ [\text{charged current (mA)} \times (1/60)t\ (h)] + \\ [\text{charged current} \times (1/60)t] + [\text{charged} \\ \text{current} \times (1/60)t] + \ldots \quad (2)$$

The battery pack A is continuously charged until the following condition is satisfied:

$$[\text{integrated charged capacity (mAh) defined} \\ \text{by}(2)] \geq [\text{reference charged capacity (mAh)} \\ \text{defined by (1)}].$$

When the above condition is satisfied, the controller 14 sets the determination result of step ST23 to YES, and stops the serial charge for the battery pack A at step ST24. Then, the controller 14 proceeds with step ST15 shown in FIG. 5.

In the above-mentioned manner, the controller 14 calculates the charged capacity, and determines the timing at which the charge is switched to the battery pack B. When charge routine #2 for the battery pack A is executed, the transistors Q1 and Q2 are ON and OFF, respectively.

A description will now be given of a second method for calculating the charged capacity. The controller 14 calculates, as a charged capacity (%) for the battery pack A, the ratio of an integrated value (mAh) of the charging current to the total integrated value (mAh) of the charging current, and determines whether the ratio thus calculated exceeds 90%. In this case, it is assumed that the point of (½)t shown in the graph of FIG. 3 corresponds to 90% of the fully charged level, and is defined as the timing at which the charge is switched to the battery pack B from the battery pack A. The section from 0t to 1t shown in FIG. 3 is divided into 60 parts so that the unit time is equal to (1/60)t. Then, the total integrated value (mAh) of the charging current obtained when the battery is fully charged is calculated beforehand.

That is, the total integrated value (mAh) of the charging current obtained in the fully charged state can be defined as follows:

[total integrated value (mAh) of charging current] = [charging current (mA) of "a" shown in FIG. 3 × (1/60)t (h)] + [charging current of "b" × (1/60)t] + [charging current of "c" × (1/60)t] + ... + [charging current of "z" × (1/60)t]   (3)

In this state, the controller 14 measures, at step 22a, the voltage drop developing across the resistor R1 every unit time, and defines the charging current derived from the measured voltage drop as the integrated value (mAh) of the charging current obtained at the present time. The integrated value (mAh) of the charging current thus obtained is stored in the controller 14.

Then, the controller 14 calculates, at step ST23, the ratio (%) of the integrated value (mAh) of the charging current to the total integrated value (mAh) of the charging current for the battery pack A, and determines whether the ratio reaches 90%. If the ratio does not reach 90%, the controller 14 sets the determination result of step ST23 to NO, and repeatedly carries out the steps ST21, ST22, ST22a and ST23 until the ratio reaches 90%.

That is, the integrated value (mAh) of the charging current obtained at the present time is calculated as follows:

[integrated value (mAh) of charging current at the present time] = [charging current (mA) × (1/60)t (h)] + [charged current × (1/60)t] + [charged current × (1/60)t]   (4)

The battery pack A is continuously charged until the following condition is satisfied:

[charged capacity (%)] = [integrated charged value (mAh) defined by (4)] ≧ [total integrated value (mAh) of charging current defined by (3)] ≧ 90%.

If the above condition is satisfied, the controller 14 sets the determination result of step ST23 to YES, and stops the serial charge to the battery pack A at step ST24. Then, the controller 14 proceeds with step ST15 shown in FIG. 5.

In the above-mentioned manner, the controller 14 calculates the charged capacity, and thus determines the timing at which the charging operation is switched to the battery pack B from the battery pack A. If charge routine #2 for the battery pack A is executed, the transistors Q1 and Q2 are ON and OFF, respectively.

The controller 14 uses either the first or second method for calculating the charged capacity (mAh or %), and thus determines the timing at which the charging operation is switched to another battery pack. It is possible to precisely determine the charged capacity as compared to the conventional battery charging device in which the charging current is merely monitored. The above-mentioned charged capacity for the battery pack A (based on 90% of the fully charged level) is an example, and another charged capacity may be defined.

When the timing at which the charging operation is switched in the first or second method for calculating the charged capacity, the controller 14 determines, at step ST15, whether another battery pack, namely, the battery pack B is connected. If it is determined that no battery pack is available, the controller 14 sets the determination result of step ST15 to NO, and executes the top-off charging operation only the battery pack A which has been charged by the serial charge in accordance with charge routine #3 (step ST18), which will be described later.

If it is determined that another battery pack is connected, the controller 14 sets the determination result of step ST15 to YES, and determines, at step ST16, whether the charging current supplied to the battery pack A exceeds a given current level. This determination refers to the value of the charging current detected at step ST15. For example, if a charging current less than the value of the charging current I obtained at the point X shown in FIG. 3, the controller 14 sets the determination result of step ST16 to YES, and proceeds with step ST18. Thus, the top-off charge, namely, charge routine #3 (step ST18) shown in FIG. 7 is carried out for the battery pack A which has been charged by the serial charge.

If a charging current greater than the value of the charging current I obtained at the point X shown in FIG. 3 is detected, the controller 14 sets the determination result of step S16 to NO, and executes the subroutine (charge routine #2) shown in FIG. 6 in order to start the serial charge for the battery pack B at step ST17. The serial charge for the battery pack B can be performed in the same manner as that for the battery pack A, and a description thereof will thus be omitted. When charge routine #2 is carried out for the battery pack B, the transistors Q2 and Q1 are respectively ON and OFF.

Since the structure shown in FIG. 4 is directed to charging the two battery packs A and B, step ST17 is executed and then step ST18 is executed. If there are three battery packs or more, the same steps as steps ST15, ST16 and ST17 are provided so as to follow step ST17.

After charge routine #2 for the battery pack B is executed, the controller 14 starts the parallel top-off charging operation (charge routine #3 shown in FIG. 7) on the battery packs A and B. At that time, the two battery packs A and B have been charged up to (½)t shown in FIG. 3. The steps ST31, ST32 and ST35 of charge routine #3 shown in FIG. 7 are the same as the steps ST21, ST22 and ST25 of charge routine #2 shown in FIG. 6, and thus a description thereof will be omitted.

Figure 7:
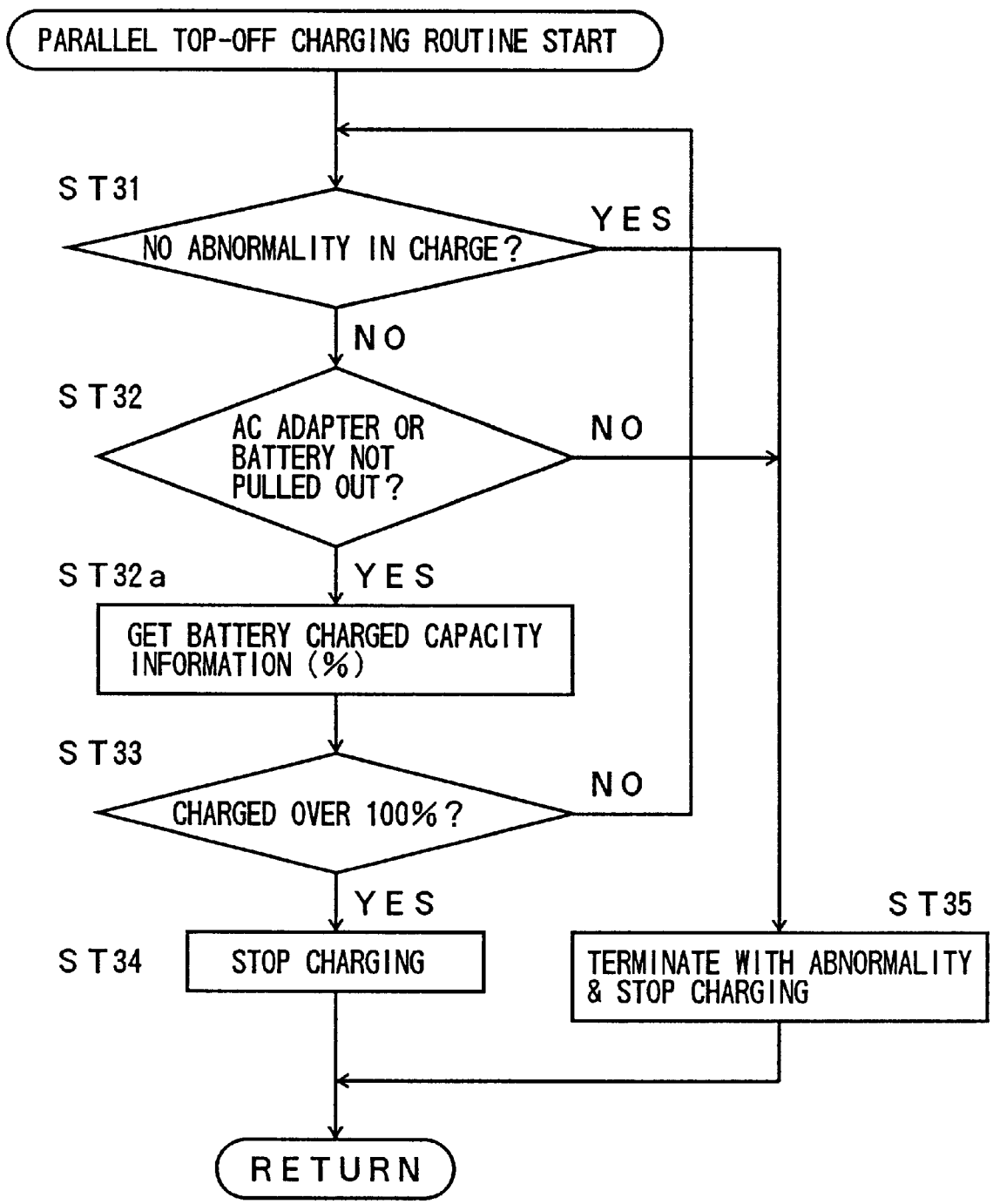
FIG. 7 is a flowchart of a third part of the operation of the controller shown in FIG. 4.

The controller 14 starts the parallel top-off charging operation if it is determined at step ST31 shown in FIG. 7 that there is no abnormality in charging (YES), and it is determined at step ST32 that the AC adapter or the battery pack A or B has not been pulled out.

A description will now be of the parallel top-off charge. The controller 14 calculates the integrated values (mAh) of the charging currents for the battery packs A and B as the charged quantities of the battery packs A and B. Then, the controller 14 determines whether the integrated values thus obtained are equal to the total integrated value (mAh) of the charging currents supplied to the two battery packs A and B necessary to obtain the fully charged states thereof, which are obtained at time t shown in FIG. 3.

That is, the charged capacity (mAh) obtained in the fully charged state, which is used as a reference for determining whether the parallel top-off charge should be terminated can be expressed as follows:

[charged capacity (mAh) in the fully charged
state] = {(charging current (mA) of "a"
shown in FIG. 3 × (1/60)t (h)] + [charging
current of "b" × (1/60)t] + [charging
current of "c" × (1/60)t] + ... + [charging
current of "z'" × (1/60)t]} × 2

(1')

At step 32a, the controller 14 measures the voltage drops respectively developing across the resistors R1 and R2 every unit time, and defines the charging currents derived from the measured voltage drops as the charged capacity (mAh). The charged quantities thus obtained are stored in the controller 14.

Then, the controller 14 determines, at step ST33, whether the integrated charged capacity reaches the charged capacity (mAh) obtained in the fully charged state. If the result of the above determination is negative, the controller 14 sets the determination result of step ST33 to NO, and repeatedly executes the steps ST31, ST32, ST32a and ST33 until the integrated charged capacity (mAh) reaches the charged capacity (mAh) obtained in the fully charged state.

That is, the charged capacity (integration of the charged currents respectively obtained every unit time) is calculated as follows:

{[charged current (mA) × (1/60)t (h)] +
[charged current × (1/60)t] + [charged
current × (1/60)t] + ...} × 2

(2')

The parallel top-off charge is continuously performed until the following condition is satisfied:

[charged capacity (mAh) defined by (2')] =
[charged capacity (mAh) in the fully charged
state defined by (1')].

When the above condition is satisfied, the controller 14 sets the determination result of step ST33 to YES, and stops the parallel top-off charge at step ST344. The, the controller 14 terminates all the processes related to charge to the battery packs A and B. Since charge routine #3 shown in FIG. 7 is directed to the parallel top-off charge to the battery packs A and B, the controller 14 maintains the transistors Q1 and Q2 in the ON state. If the battery packs A and B have fully been charged, the charging currents flowing in the resistors R1 and R2 are approximately equal to zero.

In the above-mentioned parallel top-off charge, the controller 14 may calculate, as the charged capacity of the battery packs A and B, the ratio (%) of the integrated value (mAh) of the charging currents during charge to the total integrated value (mAh) of the charging currents defined by equation (1'), and may determine whether the ratio thus calculated is equal to 100% (fully charged level).

That is, the parallel top-off charge is continuously performed until the following condition is satisfied:

[charged capacity (%)] = [integrated value
of the charging currents at the present
time defined by (2')] / [total integrated
value of the charging currents defined by
(1')] = 100%.

Figure 9:
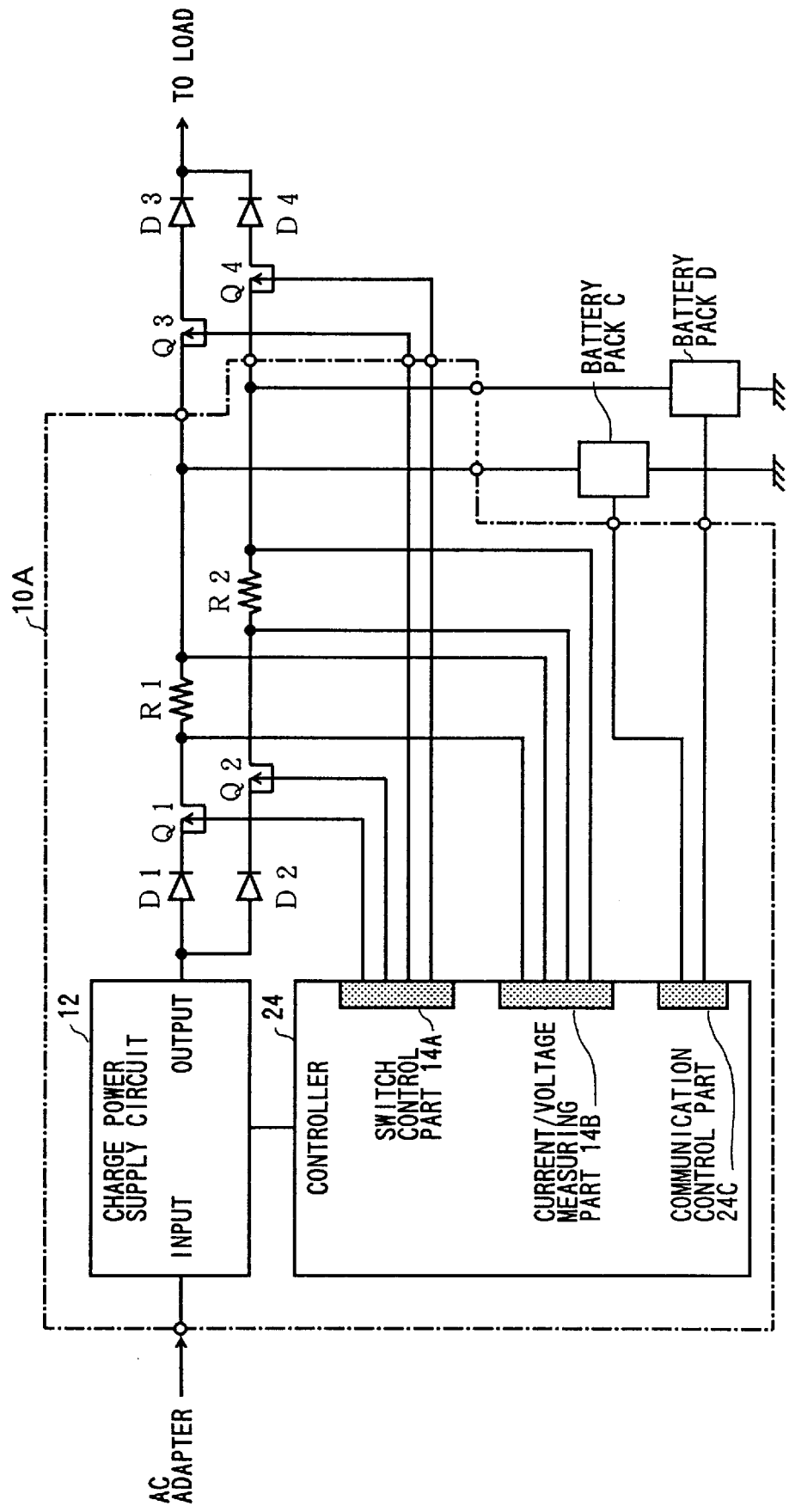
FIG. 9 is a block diagram of a battery charging device according to another embodiment of the present invention.

FIG. 9 is a block diagram of a battery charging device according to another embodiment of the present invention. In FIG. 9, parts that are the same as those shown in FIG. 4 are given the same reference numbers. A battery charging device 10A shown in FIG. 9 includes the charge power supply circuit 12, the diodes D1 and D2, the transistors Q1 and Q2, the resistors R1 and R2, and a controller 24, which is different from the controller 14 shown in FIG. 4. The charge power supply circuit 12, the diodes D1 and D2, the transistors Q1 and Q2 and the resistors R1 and R2 form a charge part, and the controller forms a control part.

The charge power supply circuit 12 of the battery charge device 10A receives the dc input voltage from the AC adapter (not shown), and generates the charge output. The charge output is supplied to the first charge path made up of the diode D1, the transistor Q1 and the resistor R1, and the second charge path made up of the diode D2, the transistor Q2 and the resistor R2.

A lithium-based battery pack C can be connected to the first charge path, and a lithium-based battery pack D can be connected to the second charge path. The battery packs C and D are respectively equipped with processors which can communicate with the controller 24.

Figure 10:
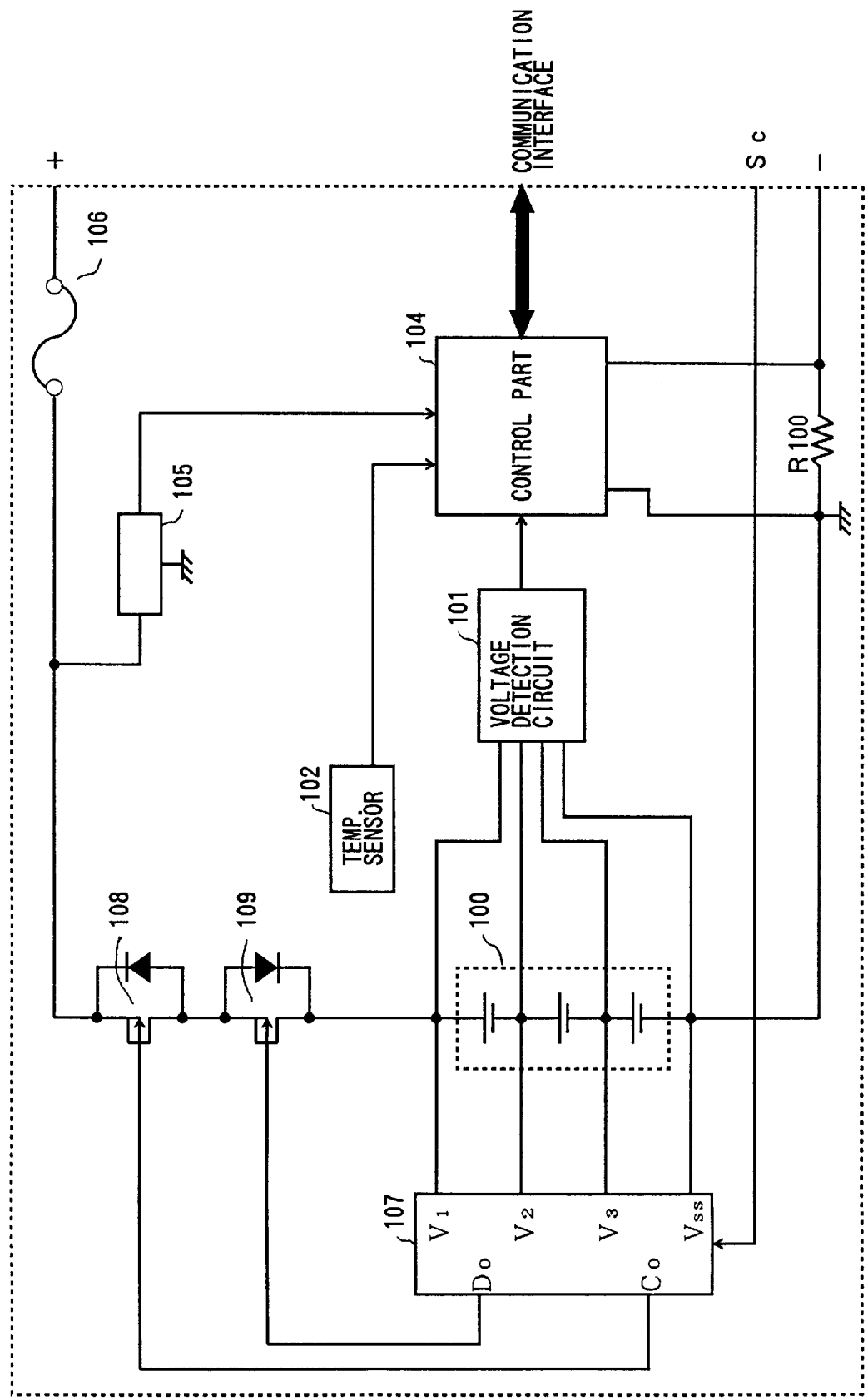
FIG. 10 is a block diagram of an internal circuit of a battery pack.

As shown in FIG. 10, each of the battery packs C and D is made up of a cell 100, a voltage detection circuit 101, a current detection resistor R100, a temperature sensor 102, a control part 104, a VCC power supply circuit 105, a fuse 106, a protection IC 107, a charge FET 108 and a discharge FET 109. The control part 104 of each of the battery packs C and D is driven by electricity of the VCC power supply circuit 15, and receives information concerning the voltage detected by the voltage detection circuit 101, the current flowing through the resistor R100, and the temperature sensed by the temperature sensor 102. Then, the control part 104 sends the received information to the battery charge device 10A via signal lines. Each of the battery packs 10C and 10D measures the voltage of the cell 100 by referring to the potentials of the pulse and minus terminals. The cell 100 is subjected to charge and discharge by turning ON and OFF the FETs 108 and 109 under the control of the protection IC 107. The charge/discharge control of the cell 100, that is, the ON/OFF control of the battery pack can be turned ON and OFF by controlling a control signal Sc supplied from the battery charge device 10A. Thus, the protection IC 107 can be used to prevent overcharge from taking place when a plurality of battery packs are simultaneously charged.

During the serial charge, each of the battery packs C and D can send the controller 24 a variety of information used to determine the timing at which another battery is subjected to charge on the basis of the information supplied from the detection or sense circuits. Referring to FIG. 11, examples of such information are related to the battery pack which is being charged, and are concerned with the charging current (mA), charging voltage (V), temperature (°K), and charged capacity (%). Other examples of the above information are related to the battery pack which is being discharged, and are concerned with a discharging current (mA) and a discharging voltage (V). The battery packs C and D are, for example, smart batteries as described in Smart Battery Data Specification Revision 1.0 Feb. 15, 1995 Copyright 1996, Benchmarq Microelectronics Inc., Duracell Inc., Energizer Power systems, Intel Corporation, Linear Technology, Maxim Integrated Products, Mitsubishi Electric Corporation, National Semiconductor Corporation, Toshiba Battery Co., Varta Batterie AG, all rights reserved.

The controller 24 includes a communication control part 24C, which communicates with the switch control part 14A, current/voltage measuring part 14B and the battery packs C and D. The switch control part 14A turns ON/OFF the transistors Q1 and Q2, which are N-channel field effect transistors, and turns ON/OFF the transistors Q3 and Q4, which are N-channel field effect transistors. The current/voltage measuring part 14B measures the voltage drops developing across the resistors R1 and R2 having known resistance values, and thus detects the currents (current I shown in FIG. 3) flowing in the first and second charge paths.

The transistor Q3 connects the battery pack C to an internal load of an electronic device via the diode D3. The transistor Q4 connects the battery pack D to the internal load of an electronic device via the diode D4.

In the configuration shown in FIG. 9, the transistors Q3 and Q4 and the diodes D3 and D4 may be provided within the battery charging device 10A. In this case, the battery charging device 10A can charge the two battery packs C and D, and has a single power supply terminal via which the power supply voltage for driving the load is output. The battery charge circuit 10A may include the AC adapter, which is not shown in FIG. 9.

The controller 24 realizes the charge sequence shown in FIG. 2 as in the same manner as the controller 14 shown in FIG. 4. The controller 24 may be formed of a general-purpose processor (for example, MB89875 produced by Fujitsu Limited), and is programmed so as to implement the sequence shown in FIG. 2. A description will now be given, with reference to FIGS. 5, 6 and 7, of the operation of the controller 24. However, the operation of the controller 24 include the same parts as those of the operation of the controller 14. Thus, a description will be given of parts of the operation of the controller 24 different from those of the operation of the controller 14. In the following description, the controller 14 and the battery packs A and B shown in FIGS. 5 through 7 should be replaced by the controller 24 and the battery packs C and D, respectively.

At step ST13 shown in FIG. 5, the controller 24 determines whether the charging current for the battery pack C exceeds a predetermined current level. This determination refers to the information indicative of the charging current sent by the battery pack C. For example, if the charging current detected is less than the charging current I obtained at point X shown in FIG. 3, the controller 24 sets the determination result of step ST13 to YES, and proceeds with step ST15. Then, the controller 24 determines whether the battery pack D is connected. If the charging current detected exceeds the charging current I obtained at the point X shown in FIG. 3, the controller 24 sets the determination result of step ST13 to NO, and recognizes at step ST14 that charge of the battery pack C should be started. Then, the controller 24 executes charge routine #2 shown in FIG. 6.

At step ST22 shown in FIG. 6, if it is determined that the AC adapter or the battery pack C has not been pulled out, the controller 24 sets the determination result of step ST22 to YES, and calculates the charged capacity in order to determine the timing at which the serial charge is switched to the battery pack D from the battery pack C.

The aforementioned first method for calculating the first charged capacity can be used. More particularly, the controller 24 calculates the integrated value of the charging current (see FIG. 11) as the charged capacity for the battery pack C, and determines whether the integrated value exceeds the given value. In this case, time (½)t shown in FIG. 3 is defined as timing at which the charge is switched to the battery pack D from the battery pack C. As the charged capacity corresponding to the above timing, the sum (the hatched area shown in FIG. 3) of the charged currents respectively obtained for each of the unit times is calculated beforehand in accordance with the aforementioned expression (1).

The controller 24 receives the charged current value from the battery pack C together with the information concerning the unit time of interest. The charged current value is stored in the controller 24 as the charged capacity (mAh) obtained at the present time.

At step ST23, the controller 24 calculates the charged capacity (the integrated value of the charge current obtained every unit time) in accordance with the aforementioned expression (2). Then, the controller 24 repeatedly performs the process for charging the battery pack C, that is, steps ST21, ST22, ST22a and ST23 until the following condition is satisfied:

[charged capacity (mAh) defined by (2)] ≧ [reference charged capacity (mAh) defined by (1)].

When the above condition is satisfied, the controller 24 sets the determination result of step ST23 to YES, and stops the serial charge to the battery pack C at step ST24. Then, the process proceeds with step ST15. In this manner, the controller 24 calculates the charged capacity and thus determines the timing at which the serial charge is switched to the battery pack D from the battery pack C.

The aforementioned second method for calculating the charged capacity can be applied. The controller 24 calculates, as the charged capacity (%) for the battery pack C, the ratio of the integrated value (mAh) of the charging current to the total integrated value (mAh) of the charging current, and determines whether the ratio thus calculated exceeds 90%. In this case, it is assumed that the point of (½)t shown in the graph of FIG. 3 corresponds to 90% of the fully charged level, and is defined as the timing at which the charge is switched to the battery pack D from the battery pack C. The total integrated value (mAh) of the charging current obtained when the battery is fully charged is calculated beforehand. The total integrated value of the charging current can be obtained in accordance with the aforementioned expression (3).

At step 22a, the controller 24 receives the charging current value from the battery pack C together with the information concerning the unit time of interest. The charged current value is stored in the controller 24 as the charged capacity (mAh) obtained at the present time.

Then, the controller 24 calculates, at step ST23, the integrated value (mAh) of the charging current at the present time in accordance with expression (4). Then, the controller 24 repeatedly performs the process for charging the battery pack C, that is, steps ST21, ST22, ST22a and ST23 until the following condition is satisfied:

[charged capacity (%)] = [integrated value (mAh) of charging current at the present time defined by (4)/[total integrated value (mAh) of charging current defined by (3)] ≧ 90%

When the above condition is satisfied, the controller 24 sets the determination result of step ST23 to YES, and stops the serial charge to the battery pack C at step ST24. Then, the process proceeds with step ST15. In this manner, the controller 24 calculates the charged capacity and thus determines the timing at which the serial charge is switched to the battery pack D from the battery pack C.

A description will now be given of a third method for calculating a charged capacity. The controller 24 receives, from the battery pack C, the charging current and charging voltage (see FIG. 11) as information on the charged capacity for the battery pack C. Then, the controller 24 calculates the integrated value (mWh) of power obtained by the product of the charging current and the charging voltage, and thus determines whether the integrated value of power exceeds a given value. In this case, time (½)t shown in FIG. 3 is defined as a timing at which the serial charge is switched to the battery pack D from the battery pack C. The section from 0t to (½)t is divided into 60 parts so that each of the divided units is equal to a time of (1/60) t). The products of the charging currents and voltages obtained for the respective units are integrated.

That is, the charged capacity which functions as the reference for switching the charging operation to another battery pack can be expressed as follows:

[charged capacity (mWh) as reference] = [the product of charging current (mA) and voltage (V) of "a" shown in FIG. 3 × (1/60)t (h)] + [the product of charging current and voltage of "b" × (1/60)t] + [the product charging current and voltage of "c" × (1/60)t] + ... + [the product of charging current and voltage of "z" × (1/60)t]

(5)

In this state, the controller 24 receives the charging current and voltage from the battery pack C together with the information concerning the unit time of interest, and calculates the power obtained by the product of the charged current and voltage. The power thus calculated is stored in the controller 24 as the charged capacity (mWh) obtained at the present time.

Then, the controller 24 determines, at step ST23, whether the integrated capacity (mWh) obtained at the present time reaches the reference charged capacity (mWh) for the battery pack C. If the result of the above determination is negative, the controller 24 sets the result of step ST23 to NO, and repeatedly performs the process of the steps ST21, ST22, ST22a and ST23 until the charged capacity (mWh) obtained at the present time reaches the reference charged capacity (mWh).

That is, the controller 24 calculates the charged capacity (integrated value of powers obtained for the respective unit times) by using the following:

[charged capacity (mWh)] = [the product of charging current (mA) and voltage (V) × (1/60)t(h)] + [the product of charging current and voltage × (1/60)t] + [the product of charging current and voltage × (1/60)t] + ...

(6)

Then, the controller 24 executes the process for charging the battery pack C until the following condition is satisfied:

[charged capacity (mWh) defined by (6)] ≧ [reference charged capacity (mWh) defined by (5)].

When the above condition is satisfied, the controller 24 sets the determination result of step ST23 to YES, and stops the serial charge to the battery pack C. Then the controller proceeds with step ST15. In this manner, the controller 24 calculates the charged capacity and determines the timing at which the serial charge is switched to the battery pack D from the battery pack C.

A description will now be given of a fourth method for calculating a charged capacity. The controller 24 receives, from the battery pack C, the charging current and charging voltage (see FIG. 11) as the charged capacity (%) for the battery pack C. Then, the controller 24 calculates the ratio (%) of the integrated value (mWh) of power during charge to the total integrated value (mWh) of power, and determines whether the ratio thus obtained exceeds 90%. In this case, it is assumed that the time (½)t shown in FIG. 3 corresponds to 90% of the fully charged level and is used as a timing at which the serial charge is switched to the battery pack D from the battery pack C. The section from 0t to (½)t is divided into 60 parts so that each of the divided units is equal to a time of (1/60)t). The products of the charging currents and voltages obtained for the respective units are integrated. Further, the total integrated value (mWh) of power obtained in the fully charged level (100%) is calculated beforehand.

The total capacity of the integrated value of power obtained at 100% can be expressed as follows:

[total integrated value (mwh) of power] = [the product of charging current (mA) and voltage (V) of "a" (mA) shown in FIG. 3 × (1/60)t(h)] + [the product of charging current and voltage of "b" × (1/60)t] + ... + [the product of charging current and voltage of "z" × (1/60)t]

(7)

In this state, the controller 24 receives, at step ST22a, the information concerning the charging current and voltage from the battery pack C together with information concerning the unit time of interest, and calculates the power obtained by the product of the charged current and voltage. The power thus calculated is stored in the controller 24 as the charged capacity (mWh) obtained at the present time.

At step ST23, the controller 24 calculates the ratio (charged capacity) (%) of the integrated value of power to the total integrated value of power for the battery pack C, and determines whether the ratio thus calculated reaches 90%. If the result of step ST23 is negative, the controller 24 sets the determination result of step ST23 to NO, and continuously performs the process of the steps ST21, ST22, ST22a and ST23.

That is, the integrated value of power obtained at the present time is calculated as follows:

[integrated value (mWh) of power at the present time] = [the product of charging current (mA) and voltage (V) × (1/60)t(h)] + [the product of charging current and voltage × (1/60)t] + [the product of charging current and voltage × (1/60)t] + ... (8)

Then, the process for charging the battery pack C is continuously performed until the following condition is satisfied:

[charged capacity (%)] = [integrated value (mWh) of power at the present time defined by (8)]/[total integrated value (mWh) of power defined by (7) ≧ 90%

When the above condition is satisfied, the controller 24 sets the determination result of step ST23 to YES, and stops the serial charge to the battery pack C at step ST24. Then, the process proceeds with step ST15.

In the above-mentioned manner, the controller 24 calculates the charged capacity, and thus determines the timing at which the serial charge is switched to the battery pack D.

When charge routine #2 is carried out for the battery pack C in any of the first through fourth methods for calculating the charged capacity, the transistors Q1 and Q2 are ON and OFF, respectively.

The controller 24 calculates the charged capacity (mAh, mWh or %) in any of the first through fourth methods, and thus determines the timing at which the serial charge is switched to another battery pack. The first through fourth methods can precisely calculate the charged capacity, as compared to the conventional battery charging device (disclosed in, for example, Japanese Laid-Open Patent Application No. 6-303729).

In a case where the information supplied from the battery pack C includes temperature information, the controller 24 can correct the charged capacity (mAh, mWh or %) obtained in any of the first through fourth methods for calculating it, so that a more precise charged capacity can be obtained.

For example, the charging efficiency is increased when the temperature is higher than ordinary temperature, and is decreased when the temperature is lower than ordinary temperature. The charging efficiency is defined as [actually charged capacity]/[charged capacity]. Hence, the corrected charged capacity can be written as follows:

[corrected charged capacity (mAh, mWh or %)] = [charged capacity (mAh, mWh or %)] × δ where δ is a temperature-based correction coefficient.

For example, when δ=0.93 at ordinary temperature, the corrected charged capacity (%) is calculated as follows:

[corrected charged capacity (mAh, mWh or %)] = 90% × 0.93 = 83.7%.

At step ST16 shown in FIG. 5, the controller 24 determines whether the charging current supplied to the battery pack D exceeds a given current value. This determination is the same as that executed at step ST13.

In the above description of the battery charging device 10A shown in FIG. 9, the information concerning the charging current, charging voltage and temperature is output from the battery packs C and D, and is used to execute any of the first through fourth methods for calculating the charged capacity. Alternatively, if the battery packs C and D are equipped with the control parts (processors) 104, any of the first through fourth methods can be executed within the battery packs C and D, and the charged capacity thus calculated is supplied to the battery charging device 10A. That is, the battery charging device 10A is not required to calculate the charged capacity in accordance with the sequences shown in FIGS. 5, 6 and 7. Hence, the battery charging device 10A determines the timing at which the serial charge is switched to the battery pack D on the basis of the charged capacity (see FIG. 11) obtained in the battery pack C.

Figure 8:
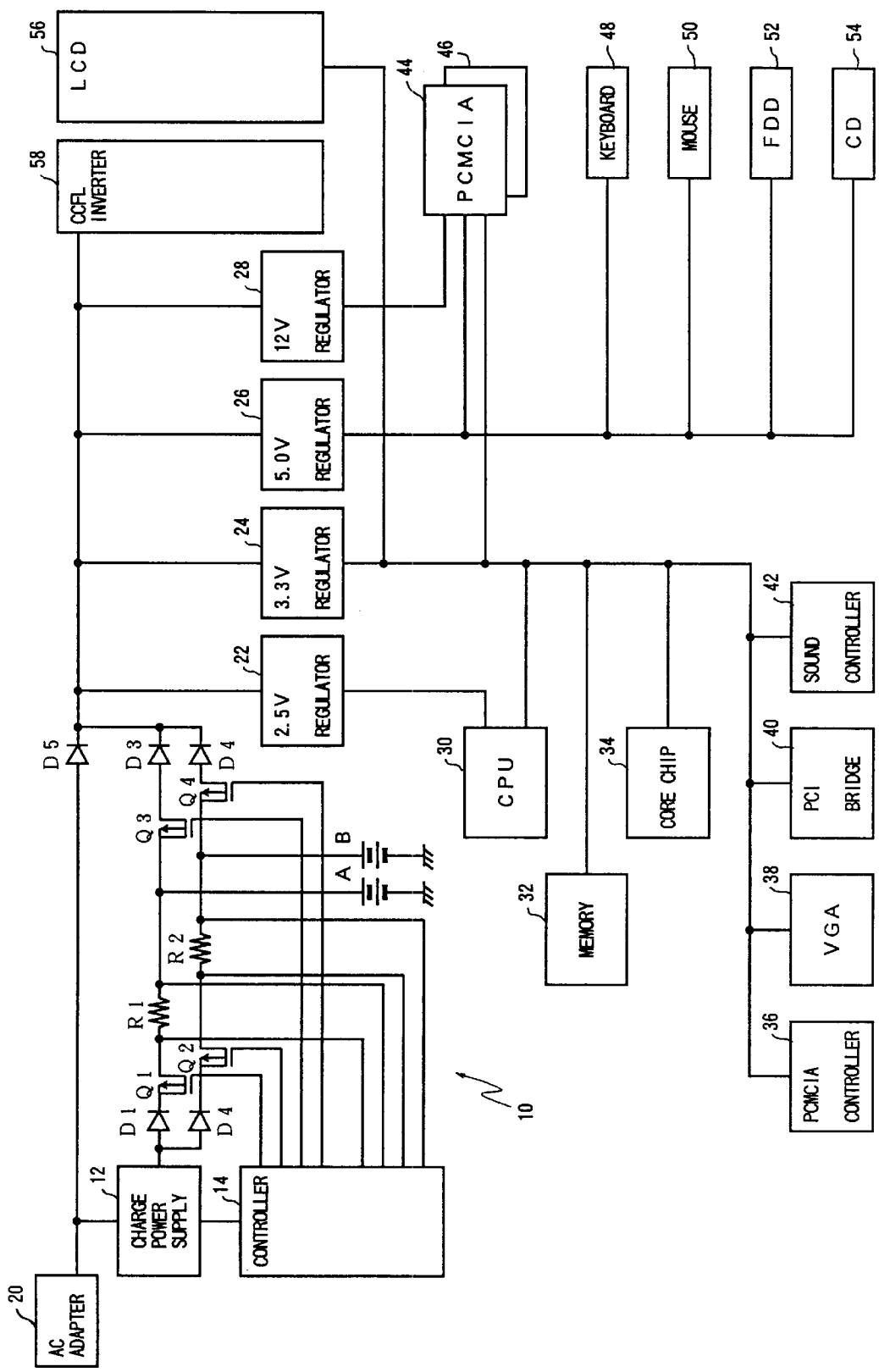
FIG. 8 is a block diagram of an electronic device equipped with the controller shown in FIG. 4.

FIG. 8 is a block diagram of a portable computer in which the aforementioned battery charging device 10 is built, and mainly illustrates a power supply system of the personal computer. In FIG. 8, parts that are the same as those shown in the previously described figures are given the same reference numbers. Transistors Q1–Q4 shown in FIG. 8 are P-channel field effect transistors.

A dc output voltage (equal to, for example, 12 V) of an AC adapter 20, which has the function to convert an ac voltage into the dc voltage, is supplied via the charge power supply circuit 12 and the diode D5, as shown in FIG. 8. The cathodes of the diodes D3, D4 and D5 are connected together.

Hereinafter, the commonly connected cathodes of the diodes D3–D5 are referred to as an output of the battery charging device 10. The battery packs A and B can detachably be loaded to the personal computer. Alternatively, one of the battery packs A and B may be loaded to the personal computer, and the other may be externally connected thereto.

Internal circuits of the personal computer are driven with different power supply voltages. Hence, there are provided regulators 22, 24, 26 and 28, which generate internal voltages from the output of the battery charging device 10. The output voltage of the battery charging voltage 10 is equal to, for example, 12 V. The regulators 22, 24, 26 and 28 respectively stabilized internal voltages of 2.5 V, 3.3 V, 5.0 V and 12 V from the output voltage of 12 V. The 2.5 V regulator 22 supplies the power supply voltage of 2.5 V to a CPU 30. The 3.3 V regulator 24 supplies the power supply voltage of 3.3 V to the CPU 30, a core chip 34, a PCMCIA controller 36, a PCI bridge 40, a sound controller 42, PCMCIA cards 44 and 46 and an LCD (Liquid Crystal Display) 56. The CPU 30 is supplied with both the 2.5 V power supply voltage and the 3.3 V power supply voltage, and can selectively use one of the two power supply voltages. The 5.0 V regulator 26 supplies the power supply voltage of 5.0 V to the PCMCIA cards 44 and 46, a keyboard 48, a mouse 50, an FDD (Floppy Disk Drive) 52 and a CD (Compact disk Drive) 54. The 12 V regulator 28 supplies the 12 V power supply voltage to the PCMCIA cards 44 and 46. Hence, the PCMCIA cards 44 and 46 driven by any of 3.3 V, 5.0 V and 12 V can be used.

A CCFL (Cold-Cathode Fluorescent Lamp) inverter 58 is a back light source for the LCD 56.

In the personal computer equipped with the battery charging device of the present invention, the battery pack A is charged up to 90% of the fully charged level, and then the battery pack B is charged up to 90%. The time necessary to charge the battery pack A or B up to 90% is approximately equal to be half the time necessary to completely charge the battery pack A or B. In FIG. 2, the battery packs A and B have been charged to 90% at time T1 according to the present invention, whereas only the battery pack A has fully be charged according to the prior art. Hence, the present invention can drive the personal computer for a longer term than the prior art. In addition, the present invention is conveniently used because one of the two battery packs A and B can be detached while the other battery pack is being charged.

The portable computer shown in FIG. 8 can be equipped with the battery charging device 10A rather than the battery charging device 10. In this case, the battery packs C and D are substituted for the battery packs A and B.

A case will be assumed that the battery pack is not detached from the portable computer equipped with the battery charging device 10A and is repeatedly charged and discharged. In this case, the battery charging device 10A can calculate the remaining capacity of the battery pack as follows. If the information supplied from the battery pack includes information concerning the charging current, the remaining capacity of the battery pack can be calculated as follows:

$$
\begin{aligned}
&\text{[integrated value (mAh) of charging current} \\
&\text{at the present time]} = \text{[charging current} \\
&\text{(mA)} \times (1/60)\text{t (h)]} + \text{[charging current} \times \\
&(1/60)\text{t]} + \text{[charging current} \times (1/60)\text{t]} \\
&+ \ldots
\end{aligned} \quad (4)
$$

$$
\begin{aligned}
&\text{[integrated value (mAh) of discharging} \\
&\text{current at the present time]} = \text{[discharging} \\
&\text{current (mA)} \times (1/60)\text{t (h)]} + \text{[discharging} \\
&\text{current} \times (1/60)\text{t]} + \text{[discharging current} \\
&\times (1/60)\text{t]} + \ldots
\end{aligned} \quad (4')
$$

$$
\text{[remaining capacity (mAh) of battery pack]} = (4) - (4') \quad (9)
$$

If the information supplied from the battery pack includes information concerning the charging voltage, the remaining capacity of the battery pack can be calculated as follows:

$$
\begin{aligned}
&\text{[integrated value (mWh) of charged power} \\
&\text{at the present time]} = \text{[the product of} \\
&\text{charging current (mA), charging voltage (V)} \\
&\text{and } (1/60)\text{t (h)]} + \text{[the product of charging} \\
&\text{current, charging voltage and } (1/60)\text{t]} + \\
&\text{[the product of charging current, charging} \\
&\text{voltage and } (1/60)\text{t]} + \ldots
\end{aligned} \quad (8)
$$

$$
\begin{aligned}
&\text{[integrated value (mWh) of discharged power} \\
&\text{at the present time]} = \text{[the product of} \\
&\text{discharging current (mA), discharging} \\
&\text{voltage (V) and } (1/60)\text{t (h)]} + \text{[the product} \\
&\text{of discharging current, discharging voltage} \\
&\text{and } (1/60)\text{t]} + \text{[the product of discharging}
\end{aligned}
$$

-continued $$
\begin{aligned}
&\text{current, discharging voltage and } (1/60)\text{t]} \\
&+ \ldots
\end{aligned} \quad (8')
$$

$$
\text{[remaining capacity (mWh) of battery pack]} = (8) - (8') \quad (9')
$$

The expression (9) is suitable for the portable computer in which discharge takes place with a constant current. The expression (9') is suitable for the portable computer in which discharge takes place with a constant power.

The present invention includes an arrangement in which three battery packs or more are charged. In this case, charging circuits like the first and second charging circuits are provided to the respective battery packs, and are controlled by the controller 14 or 24.

The present invention is not limited to the specifically disclosed embodiments, and variations and modifications may be made without departing from the scope of the present invention.

What is claimed is:

1. A battery charging device which charges a plurality of batteries, comprising:
    a charging part which supplies a charging current; and
    a control part which controls the charging part so that the batteries are serially charged one by one and a supplemental charge to the batteries is then performed in parallel,
    the control part calculating a charged capacity for a first one of the batteries and thus determining a timing in which serial charge is switched to a second one of the batteries on the basis of the charged capacity.

2. The battery charging device as claimed in claim 1, wherein the charged capacity is an integrated value of a charging current supplied to the first one of the batteries.

3. The battery charging device as claimed in claim 1, wherein the charging capacity is a ratio of an integrated value of a charging current supplied to the first one of the batteries to a total integrated value of the charging current obtained in a fully charged state.

4. A battery charging device having a function of communicating with a plurality of batteries, comprising:
    a charging part which supplies a charging current; and
    a control part which controls the charging part so that the batteries are serially charged one by one and a supplemental charge to the batteries is then performed in parallel,
    the control part calculating a charged capacity for a first one of the batteries on the basis of predetermined information supplied therefrom and thus determining a timing in which serial charge is switched to a second one of the batteries on the basis of the charged capacity.

5. The battery charging device as claimed in claim 4, wherein, if the predetermined information includes information concerning the charged capacity calculated beforehand, the control part determining the timing in which serial charge is switched on the basis of the charged capacity included in the predetermined information.

6. The battery charging device as claimed in claim 4, wherein, if the predetermined information includes information concerning a charging current supplied to the first one of the batteries which is being charged or information concerning the charged capacity calculated beforehand, the charged capacity is an integrated value of the charging current.

7. The battery charging device as claimed in claim 4, wherein, if the predetermined information includes information concerning a charging current supplied to the first one of the batteries which is being charged or information concerning the charged capacity calculated beforehand, the charged capacity is a ratio of an integrated value of the charging current supplied to the first one of the batteries to a total integrated value of the charging current obtained in a fully charged state.

8. The battery charging device as claimed in claim 4, wherein, if the predetermined information includes information concerning a charging current and a charging voltage supplied to the first one of the batteries which is being charged or information concerning the charged capacity calculated beforehand, the charged capacity is an integrated value of power obtained by a product of the charging current and the charging voltage.

9. The battery charging device as claimed in claim 4, wherein, if the predetermined information includes information concerning a charging current and a charging voltage supplied to the first one of the batteries which is being charged or information concerning the charged capacity calculated beforehand, the charged capacity is a ratio of an integrated value of power already supplied to the first one of the batteries to a total integrated value of power in a fully charged state.

10. The battery charging device as claimed in any of claims 4 to 9, wherein, if the predetermined information includes temperature information, the control parts corrects the charged capacity on the basis of the temperature information.

11. The battery charging device as claimed in claim 1, wherein:

the charging part includes switches respectively connected to the batteries in series; and the control part controls the switches.

12. The battery charging device as claimed in claim 4, wherein:

the charging part includes switches respectively connected to the batteries in series; and the control part controls the switches.

13. The battery charging device as claimed in claim 1, wherein the batteries are lithium-based batteries.

14. The battery charging device as claimed in claim 4, wherein the batteries are lithium-based batteries.

15. A method for charging a plurality of batteries by a battery charging device which includes a charging part supplying a charging current, said method comprising the steps of:

(a) serially charging the batteries one by one and then performing a supplemental charge to the batteries in parallel; and (b) calculating a charged capacity for a first one of the batteries and thus determining a timing in which serial charge is switched to a second one of the batteries on the basis of the charged capacity.

16. The method as claimed in claim 15, wherein the charged capacity is an integrated value of a charging current supplied to the first one of the batteries.

17. The method as claimed in claim 15, wherein the charging capacity is a ratio of an integrated value of a charging current supplied to the first one of the batteries to a total integrated value of the charging current obtained in a fully charged state.

18. A method of charging a plurality of batteries by a device having a function of communicating with the batteries and a charging part supplying a charging current, said method comprising the steps of:

(a) serially charging the batteries one by one and performing a supplemental charge to the batteries in parallel; and (b) calculating a charged capacity for a first one of the batteries on the basis of predetermined information supplied therefrom and thus determining a timing in which serial charge is switched to a second one of the batteries on the basis of the charged capacity.

19. The method as claimed in claim 18, further comprising the step of, if the predetermined information includes information concerning the charged capacity calculated beforehand, determining the timing in which serial charge is switched on the basis of the charged capacity included in the predetermined information.

20. The method as claimed in claim 18, further comprising the step of, if the predetermined information includes information concerning a charging current supplied to the first one of the batteries which is being charged or information concerning the charged capacity calculated beforehand, the charged capacity is an integrated value of the charging current.

21. The method as claimed in claim 18, wherein, if the predetermined information includes information concerning a charging current supplied to the first one of the batteries which is being charged or information concerning the charged capacity calculated beforehand, the charged capacity is a ratio of an integrated value of the charging current supplied to the first one of the batteries to a total integrated value of the charging current obtained in a fully charged state.

22. The method as claimed in claim 18, wherein, if the predetermined information includes information concerning a charging current and a charging voltage supplied to the first one of the batteries which is being charged or information concerning the charged capacity calculated beforehand, the charged capacity is an integrated value of power obtained by a product of the charging current and the charging voltage.

23. The method as claimed in claim 18, wherein, if the predetermined information includes information concerning a charging current and a charging voltage supplied to the first one of the batteries which is being charged or information concerning the charged capacity calculated beforehand, the charged capacity is a ratio of an integrated value of power already supplied to the first one of the batteries to a total integrated value of power in a fully charged state.

24. The method as claimed in any of claims 18 to 23, further comprising the step of, if the redetermined information includes temperature information, correcting the charged capacity on the basis of the temperature information.

25. An electronic device comprising:

a battery charging device which charges a plurality of batteries, said battery charging device comprising:

a charging part which supplies a charging current; and a control part which controls the charging part so that the batteries are serially charged one by one and a supplemental charge to the batteries is then performed in parallel, the control part calculating a charged capacity for a first one of the batteries and thus determining a timing in which serial charge is switched to a second one of the batteries on the basis of the charged capacity.

26. The electronic device as claimed in claim 25, wherein the charged capacity is an integrated value of a charging current supplied to the first one of the batteries.

27. The electronic device as claimed in claim 25, wherein the charging capacity is a ratio of an integrated value of a charging current supplied to the first one of the batteries to a total integrated value of the charging current obtained in a fully charged state.

28. An electronic device comprising:
a battery charging device having a function of communicating with a plurality of batteries, said battery charging device comprising:
a charging part which supplies a charging current; and
a control part which controls the charging part so that the batteries are serially charged one by one and a supplemental charge to the batteries is then performed in parallel,
the control part calculating a charged capacity for a first one of the batteries on the basis of predetermined information supplied therefrom and thus determining a timing in which serial charge is switched to a second one of the batteries on the basis of the charged capacity.

29. The electronic device as claimed in claim 28, wherein, if the predetermined information includes information concerning the charged capacity calculated beforehand, the control part determining the timing in which serial charge is switched on the basis of the charged capacity included in the predetermined information.

30. The electronic device as claimed in claim 28, wherein, if the predetermined information includes information concerning a charging current supplied to the first one of the batteries which is being charged or information concerning the charged capacity calculated beforehand, the charged capacity is an integrated value of the charging current.

31. The electronic device as claimed in claim 28, wherein, if the predetermined information includes information concerning a charging current supplied to the first one of the batteries which is being charged or information concerning the charged capacity calculated beforehand, the charged capacity is a ratio of an integrated value of the charging current supplied to the first one of the batteries to a total integrated value of the charging current obtained in a fully charged state.

32. The electronic device as claimed in claim 28, wherein, if the predetermined information includes information concerning a charging current and a charging voltage supplied to the first one of the batteries which is being charged or information concerning the charged capacity calculated beforehand, the charged capacity is an integrated value of power obtained by a product of the charging current and the charging voltage.

33. The electronic device as claimed in claim 28, wherein, if the predetermined information includes information concerning a charging current and a charging voltage supplied to the first one of the batteries which is being charged or information concerning the charged capacity calculated beforehand, the charged capacity is a ratio of an integrated value of power already supplied to the first one of the batteries to a total integrated value of power in a fully charged state.

34. The electronic device as claimed in any of claims 28 to 33, wherein, if the predetermined information includes temperature information, the control parts corrects the charged capacity on the basis of the temperature information.

35. A control circuit provided in a battery charging device which charges a plurality of batteries, said control circuit comprising:
a charging part which supplies a charging current; and
a control part which controls the charging part so that the batteries are serially charged one by one and a supplemental charge to the batteries is then performed in parallel,
the control part calculating a charged capacity for a first one of the batteries and thus determining a timing in which serial charge is switched to a second one of the batteries on the basis of the charged capacity.

36. A control circuit provided in a battery charging device which charges a plurality of batteries, said control circuit comprising:
a charging part which supplies a charging current; and
a control part which controls the charging part so that the batteries are serially charged one by one and a supplemental charge to the batteries is then performed in parallel,
the control part calculating a charged capacity for a first one of the batteries on the basis of predetermined information supplied therefrom and thus determining a timing in which serial charge is switched to a second one of the batteries on the basis of the charged capacity.

37. The control circuit as claimed in claimed in 36, wherein, if the predetermined information includes information concerning the charged capacity calculated beforehand, the control part determining the timing in which serial charge is switched on the basis of the charged capacity included in the predetermined information.

38. A control apparatus of a battery charging device which charges a plurality of batteries by a current supplied from a charging part, said control apparatus comprising:
a first control part which controls the charging part so that the batteries are serially charged one by one and a supplemental charge to the batteries is then performed in parallel,
a second control part which calculates a charged capacity for a first one of the batteries and thus determined a timing in which serial charge is switched to a second one of the batteries on the basis of the charged capacity.

39. The control apparatus as claimed in claim 38, wherein the charged capacity is an integrated value of a charging current supplied to the first one of the batteries.

40. The control apparatus as claimed in claim 38, wherein the charging capacity is a ration of an integrated value of a charging current supplied to the first one of the batteries.

41. A control apparatus of a battery charging device which charges a plurality of batteries and has a charging part which supplies a charging current, said control apparatus controlling a charging part and having a function of communicating with a plurality of batteries; said control apparatus comprising:
a first control part which controls the charging device which charges a plurality of batteries one by one and a supplemental charge to the batteries is then performed in parallel,
a second control part calculating a charged capacity for a first one of the batteries on the basis of predetermined information supplied therefrom and thus determining a timing in which serial charge is switched to a second one of the batteries on the basis of the charged capacity.

42. The control apparatus as claimed in claim 41, wherein, if the predetermined information includes information concerning the charged capacity calculated beforehand, the second control part determining the timing in which serial charge is switched on the basis of the charged capacity included in the predetermined information.

43. The control apparatus as claimed in claim 41, wherein, if the predetermined information includes information concerning a charging current supplied to the first one of the batteries which is being charged or information concerning the charged capacity calculated beforehand, the charged capacity is an integrated value of the charging current.

44. The control apparatus as claimed in claim 41, wherein, if the predetermined information includes information concerning a charging current supplied to the first one of the batteries which is being charged or information concerning the charged capacity calculated beforehand the charged capacity is a ratio of an integrated value of the charging current supplied to the first one of the batteries to a total integrated value of the charging current obtained in a fully charged state.

45. The control apparatus as claimed in claim 41, wherein, if the predetermined information includes information concerning a charging current and a charging current and a charging voltage supplied to the first one of the batteries which is being charged or information concerning the charged capacity calculated beforehand, the charged capacity is an integrated value of power obtained by a product of the charging current and the charging voltage.

46. The battery charging device as claimed in claim 41, wherein, if the predetermined information includes information concerning a charging current and a charging voltage supplied to the first one of the batteries which is being charged or information concerning the charged capacity calculated beforehand, the charged capacity is a ratio of an integrated value of power already supplied to the first one of the batteries to a total integrated value of power in a fully charged state.

* * * * *